US011630450B2

(12) United States Patent
Tokuno et al.

(10) Patent No.: US 11,630,450 B2
(45) Date of Patent: Apr. 18, 2023

(54) QUALITY CONTROL DEVICE, QUALITY CONTROL METHOD, AND PROGRAM

(71) Applicant: FUJIFILM CORPORATION, Tokyo (JP)

(72) Inventors: Yu Tokuno, Kanagawa (JP); Shinichi Sugawara, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 64 days.

(21) Appl. No.: 17/117,097

(22) Filed: Dec. 9, 2020

(65) Prior Publication Data

US 2021/0200198 A1 Jul. 1, 2021

(30) Foreign Application Priority Data

Dec. 27, 2019 (JP) .............................. JP2019-238178

(51) Int. Cl.
*G05B 23/02* (2006.01)
*G05B 13/02* (2006.01)
(Continued)

(52) U.S. Cl.
CPC ..... *G05B 23/0262* (2013.01); *G05B 13/0265* (2013.01); *G05B 19/41875* (2013.01);
(Continued)

(58) Field of Classification Search
CPC .. G05B 13/029; G05B 13/042; G05B 13/048; G05B 17/02; G05B 19/41885;
(Continued)

(56) References Cited

U.S. PATENT DOCUMENTS

2005/0288812 A1* 12/2005 Cheng .............. G05B 19/41875
700/109
2011/0282480 A1* 11/2011 Jang .................. G05B 23/0243
700/110
(Continued)

FOREIGN PATENT DOCUMENTS

JP 2004-296036 A 10/2004
JP 2012-027683 A 2/2012
(Continued)

OTHER PUBLICATIONS

English language translation of the following: Office action dated Oct. 25, 2022 from the JPO in a Japanese patent application No. 2019-238178 corresponding to the instant patent application. This office action translation is submitted now in order to supplement the understanding of the cited references which are being disclosed in the instant Information Disclosure Statement.

*Primary Examiner* — Yoshihisa Ishizuka
*Assistant Examiner* — Carter W Ferrell
(74) *Attorney, Agent, or Firm* — SOLARIS Intellectual Property Group, PLLC

(57) ABSTRACT

A quality control device that controls quality of a product manufactured through a plurality of processes, includes a prediction model generation unit that generates a prediction model to predict quality of a product with respect to unknown process data by performing learning using known process data obtained from the plurality of processes and a measured value of quality of the product with respect to the known process data as learning data; a quality prediction unit that derives a predictive value of quality of each of a plurality of products, which are manufactured after the prediction model is generated, on the basis of the prediction model using process data of the plurality of products as input data; and an inspection target decision unit that decides the product for which the predictive value having the smallest (Continued)

margin with respect to a preset standard is obtained as an inspection target, among the plurality of predictive values of quality obtained by the quality prediction unit.

10 Claims, 17 Drawing Sheets

(51) Int. Cl.
 *G06Q 10/0639* (2023.01)
 *G06Q 50/04* (2012.01)
 *G05B 19/418* (2006.01)
(52) U.S. Cl.
 CPC ..... *G05B 23/0227* (2013.01); *G05B 23/0264* (2013.01); *G06Q 10/06395* (2013.01); *G06Q 50/04* (2013.01); *G05B 2219/32194* (2013.01)
(58) Field of Classification Search
 CPC ........... G05B 2219/32368; G05B 2219/32179; G05B 23/0294; G05B 23/0262; G05B 13/0265; G05B 23/0227; G05B 23/0264; G05B 2219/32194; G05B 19/41875; Y02P 90/30; Y02P 90/02; G06N 20/00; G06N 3/08; G06N 3/0454; G06N 3/088; G06Q 10/06395; G06Q 50/04; G06F 2119/18; G06F 30/20
 See application file for complete search history.

(56) References Cited

U.S. PATENT DOCUMENTS

| | | | | |
|---|---|---|---|---|
| 2015/0356521 | A1* | 12/2015 | Sridhar | .................... E21B 17/20 705/305 |
| 2016/0077520 | A1* | 3/2016 | Ohgushi | .......... G05B 19/41875 700/109 |
| 2020/0293011 | A1* | 9/2020 | Kanaya | ................ G05B 13/048 |
| 2021/0191375 | A1* | 6/2021 | Ai | .................... G05B 19/41885 |
| 2021/0287122 | A1* | 9/2021 | Nomura | ............. G05B 23/0289 |

FOREIGN PATENT DOCUMENTS

| | | |
|---|---|---|
| JP | 2012-226511 A | 11/2012 |
| JP | 2016-062266 A | 4/2016 |

\* cited by examiner

FIG. 9

| PROCESS DATA (EXPLANATORY VARIABLE) | | | | QUALITY (OBJECTIVE VARIABLE) |
|---|---|---|---|---|
| SFD OF FERROMAGNETIC POWDER ($X_1$) | DRYING AIR TEMPERATURE ($X_2$) | DRYING AIR VOLUME ($X_3$) | TAPE WIDTH ($X_4$) | REPRODUCTION OUTPUT ($Y$) |

MULTIPLE REGRESSION EQUATION: $Y = a_1X_1 + a_2X_2 + a_3X_3 + a_4X_4 + b$

COEFFICIENT   CONSTANT

FIG. 10

| ROLL No. | PROCESS DATA (EXPLANATORY VARIABLE) | | | | QUALITY (OBJECTIVE VARIABLE) |
|---|---|---|---|---|---|
| | SFD OF FERROMAGNETIC POWDER ($X_1$) | DRYING AIR TEMPERATURE ($X_2$) | DRYING AIR VOLUME ($X_3$) | TAPE WIDTH ($X_4$) | REPRODUCTION OUTPUT ($Y$) |
| 1 | 0.10 | 80°C | 99 Nm/min | 12.7 mm | 100% |
| 2 | 0.11 | 81°C | 99 Nm/min | 12.7 mm | 101% |

P   P

⇩ LEARNING (OPTIMIZATION OF COEFFICIENT AND CONSTANT)

SUBSTITUTION OF OPTIMAL COEFFICIENT AND CONSTANT INTO MULTIPLE REGRESSION EQUATION

⇩

PREDICTION MODEL M

QUALITY CONTROL DEVICE, QUALITY CONTROL METHOD, AND PROGRAM

CROSS-REFERENCE TO RELATED APPLICATIONS

The present application claims priority under 35 U.S.C. § 119 to Japanese Patent Application No., 2019-238178 filed on Dec. 27, 2019. The above application is hereby expressly incorporated by reference, in its entirety, into the present application.

BACKGROUND

1. Technical Field

The technology of the present disclosure relates to a quality control device, a quality control method, and a program.

2. Description of the Related Art

In recent years, as storage media that can manage and preserve data in a safe environment while reducing costs, magnetic tape media are getting attention again. The magnetic tape media are produced through a manufacturing process of manufacturing a magnetic tape and an assembly process of incorporating the manufactured magnetic tape into a cartridge (for example, refer to JP2004-296036A).

In the manufacturing process of the magnetic tape, a coating process, a calendering process, a cutting process, and the like are included. In the manufacturing process of the magnetic tape, a roll is formed by applying a magnetic paint to a base film in the coating process, performing alignment processing for aligning the orientations of magnetic materials of the applied magnetic paint, and then drying the magnetic paint. The roll is cut into a tape shape in the cutting process, the magnetic tape obtained by the cutting is wound around a hub to manufacture a so-called pancake.

In the assembly process, a signal writing process, an incorporating process, and the like are included. In the assembly process, a servo write signal is written to the pancake in the signal writing process, and the magnetic tape is incorporated into the cartridge from the pancake in the incorporating process.

SUMMARY

In the manufacturing process of the magnetic tape, manufacture is performed with a plurality of rolls as a single unit (hereinafter, referred to as one lot), and each lot is subjected to an inspection process (hereinafter, referred to as a lot withdrawal inspection process) and is withdrawn to the assembly process. In the lot withdrawal inspection process, a quality inspection is performed by sampling the pancake included in a partial roll from the plurality of rolls included in one lot, and in a case where the inspection result is favorable, the lot is withdrawn to the assembly process.

In such a sampling inspection, in order to guarantee the quality of all products included in one lot, it is preferable to increase the number of products as the inspection target. However, in a case where the number of products as the inspection target is increased in order to guarantee the quality, the inspection cost is increased. In particular, in a case where the inspected products are discarded without shipping, the increase in the number of products as the inspection target causes more inspection costs.

Such a problem is not limited to the magnetic tape cartridge, and may occur in manufacturing products for which sampling inspection is performed.

An object of the technology of the present disclosure is to provide a quality control device, a quality control method, and a program which can guarantee the quality for a plurality of products and reduce inspection costs.

In order to achieve the object, a quality control device according to an aspect of the present disclosure is a quality control device that controls quality of a product manufactured through a plurality of processes, and includes a prediction model generation unit that generates a prediction model to predict quality of a product with respect to unknown process data by performing learning using known process data obtained from the plurality of processes and a measured value of quality of the product with respect to the known process data as learning data; a quality prediction unit that derives a predictive value of quality of each of a plurality of products, which are manufactured after the prediction model is generated, on the basis of the prediction model using process data of the plurality of products as input data; and an inspection target decision unit that decides the product for which the predictive value having the smallest margin with respect to a preset standard is obtained as an inspection target, among the plurality of predictive values of quality obtained by the quality prediction unit.

It is preferable that the quality control device further includes a defective/non-defective determination unit that determines that all of the plurality of products are non-defective in a case where a residual representing a difference between the predictive value of the product decided as the inspection target by the inspection target decision unit and the measured value of quality of the product obtained by inspecting the inspection target is within an error range which is an allowable error range.

It is preferable that the error range is a range determined on the basis of a standard deviation representing a variation of the known quality with respect to the predictive value.

It is preferable that the quality control device further includes a preliminary determination unit that determines whether all of values obtained by adding the error range to the predictive values derived by the quality prediction unit are within the standard, in which the inspection target decision unit performs decision of the inspection target in a case where the preliminary determination unit determines that all of the values obtained by adding the error range to the predictive values are within the standard.

It is preferable that the quality control device further includes a prediction model update unit that causes the prediction model generation unit to update the prediction model using the measured values of quality of the plurality of products in a case where the defective/non-defective determination unit determines that the residual is not within the error range.

It is preferable that the quality control device further includes a process data determination unit that determines whether the process data of the plurality of products manufactured after the prediction model is generated is within a range of the known process data, in which the prediction model update unit causes the prediction model generation unit to update the prediction model using the measured values of quality of the plurality of products in a case where the process data determination unit determines that the process data of the plurality of products is not within the range of the known process data.

It is preferable that the process data determination unit determines whether the process data of the plurality of products is within the range of the known process data by an MT method or a method in which a Mahalanobis distance is replaced with a Euclidean distance in the MT method.

A quality control method according to another aspect of the present disclosure is a quality control method of controlling quality of a product manufactured through a plurality of processes, the quality control method including generating a prediction model to predict quality of a product with respect to unknown process data by performing learning using known process data obtained from the plurality of processes and a measured value of quality of the product with respect to the known process data as learning data; deriving a predictive value of quality of each of a plurality of products, which are manufactured after the prediction model is generated, on the basis of the prediction model using process data of the plurality of products as input data; and deciding the product for which the predictive value having the smallest margin with respect to a preset standard is obtained as an inspection target, among the plurality of predictive values of quality obtained in the deriving of the predictive value of quality.

A program according to still another aspect of the present disclosure is a program of controlling quality of a product manufactured through a plurality of processes, the program causing a computer to execute generating a prediction model to predict quality of a product with respect to unknown process data by performing learning using known process data obtained from the plurality of processes and a measured value of quality of the product with respect to the known process data as learning data; deriving a predictive value of quality of each of a plurality of products, which are manufactured after the prediction model is generated, on the basis of the prediction model using process data of the plurality of products as input data; and deciding the product for which the predictive value having the smallest margin with respect to a preset standard is obtained as an inspection target, among the plurality of predictive values of quality obtained in the deriving of the predictive value of quality.

According to the technology of the present disclosure, it is possible to provide a quality control device, a quality control method, and a program which can guarantee the quality for a plurality of products and reduce inspection costs.

BRIEF DESCRIPTION OF THE DRAWINGS

Exemplary embodiments according to the technique of the present disclosure will be described in detail based on the following figures, wherein:

FIG. 9 is a diagram illustrating a specific example of process data and quality, FIG. 10 is a diagram for describing a generation method of a prediction model.

DETAILED DESCRIPTION

Hereinafter, embodiments of the present disclosure will be described. In the following embodiment, a production process of a magnetic tape cartridge (hereinafter, simply referred to as a cartridge) will be described as an example of a production process.

Figure 1:
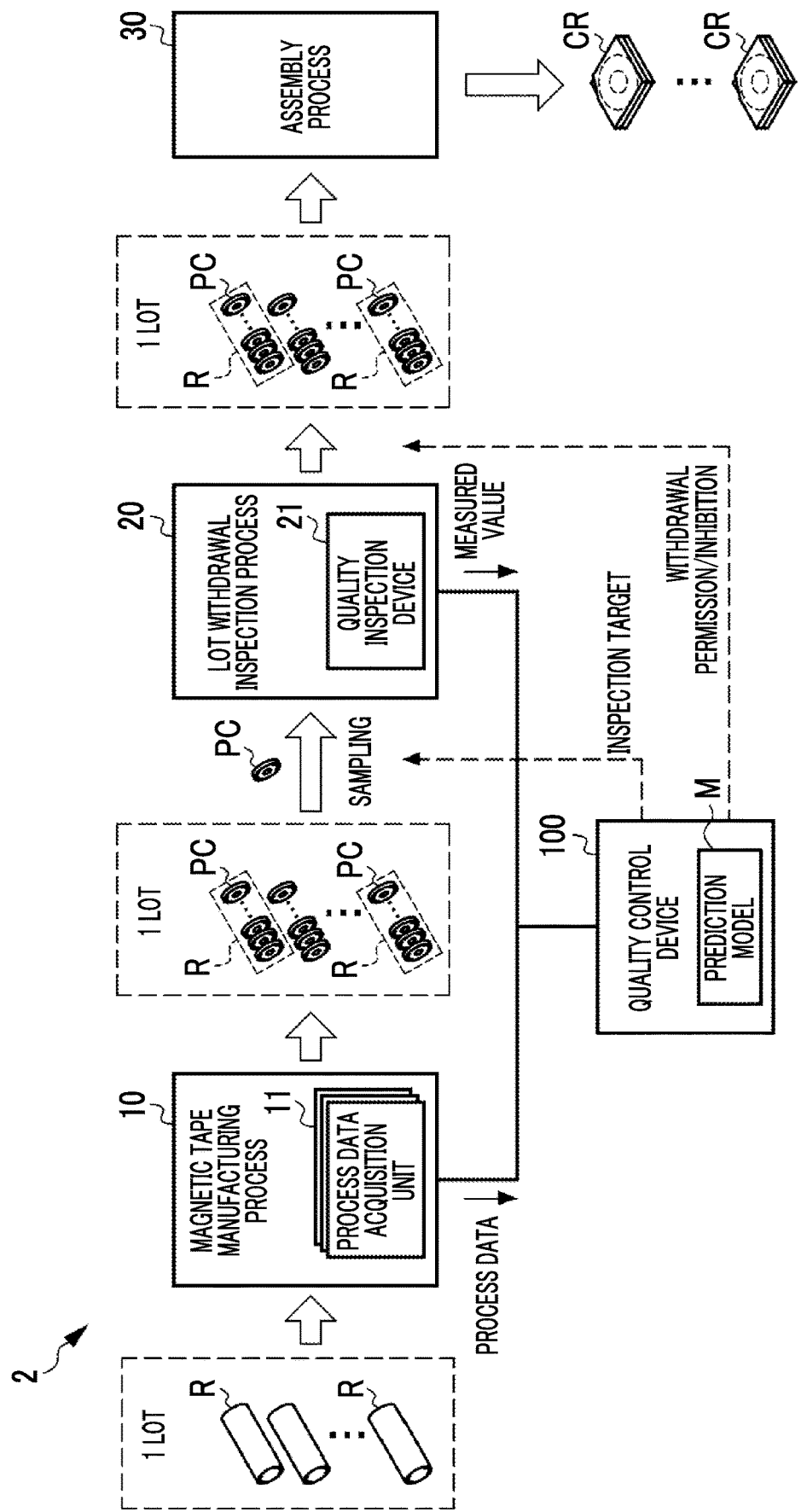
FIG. 1 is a diagram illustrating a production process of a magnetic tape cartridge.

In FIG. 1, in a production process 2, a magnetic tape manufacturing process 10, a lot withdrawal inspection process 20, and an assembly process 30 are included. Further, a quality control device 100 is provided in the production process 2.

The magnetic tape manufacturing process 10 has a plurality of manufacturing processes which will be described below in detail. In the magnetic tape manufacturing process 10, a so-called pancake PC is manufactured as the magnetic tape on the basis of a film-shaped roll R. In the magnetic tape manufacturing process 10, a plurality of pancakes PC are manufactured for each roll R with a plurality of rolls R as a unit. Hereinafter, in the magnetic tape manufacturing process 10, a unit of a plurality of rolls R manufactured under the same predetermined condition (material, time, device, or the like) is referred to as a lot. For example, in the magnetic tape manufacturing process 10, 100 rolls R are manufactured as one lot.

In each manufacturing process included in the magnetic tape manufacturing process 10, a process data acquisition unit 11 is provided for acquiring various kinds of process data. The process data is various kinds of data relating to the manufacturing. The process data includes characteristics of materials or products used in the manufacturing in each manufacturing process, manufacturing conditions, states of manufacturing devices, time required for the manufacturing, elapse time from the end of a previous manufacturing process, and the like.

The process data acquisition unit 11 is configured by a sensor, a timer, a data input terminal, a data reading terminal, or the like. The process data is acquired by a measurement using the sensor or the timer, by an input from an operator using the data input terminal, or by reading a slip or the like in which the process data is entered, using the data reading terminal.

Each process data acquisition unit 11 is communicatively connected to the quality control device 100 via a network such as a local area network (LAN). In a case where the process data acquisition unit 11 is configured by the sensor or the timer, the process data acquisition unit 11 transmits a measured value to the quality control device 100 automatically or in response to the request from the quality control device 100. In a case where the process data acquisition unit 11 is configured by the data input terminal, the process data acquisition unit 11 transmits the process data, which is input from the operator, to the quality control device 100 automatically or in response to the request from the quality control device 100. In a case where the process data acquisition unit 11 is configured by the data reading terminal, the process data acquisition unit 11 transmits the read process data to the quality control device 100 automatically or in response to the request from the quality control device 100.

In the lot withdrawal inspection process 20, a quality inspection device 21 is provided. The quality inspection device 21 inspects, for example, the magnetic characteristics of the pancake PC as the quality of the roll R. In the lot withdrawal inspection process 20, one roll R is selected from among the plurality of rolls R included in one lot as the inspection target, and is subjected to the quality inspection. That is, in the lot withdrawal inspection process 20, a sampling inspection is performed.

In the present embodiment, among a plurality of pancakes PC included in one roll R selected as the inspection target, the quality inspection is performed on one or more pancakes PC by the quality inspection device 21. In the present embodiment, only the pancake PC which is sampled as the inspection target is subjected to the inspection by the quality inspection device 21 in a state of being in a cartridge CR by the assembly process 30 described below. In the lot withdrawal inspection process 20, the quality inspection may be performed on the pancake PC as it is without being limited to the cartridge CR.

As will be described below in detail, the quality control device 100 has a prediction model M to predict the quality of the roll R from the process data acquired by the process data acquisition unit 11. After manufacturing for new one lot is performed in the magnetic tape manufacturing process 10, the quality control device 100 predicts the quality of each roll R included in the corresponding lot using the prediction model M on the basis of the process data transmitted from the process data acquisition unit 11.

Then, the quality control device 100 decides a roll R for which the predictive value having the smallest margin with respect to a standard value of quality is obtained, as the inspection target on the basis of the predictive values. Among the plurality of pancakes PC included in the roll R which is selected as the inspection target from among the rolls R for one lot, one or more pancakes PC are sampled to be sent to the lot withdrawal inspection process 20.

In the lot withdrawal inspection process 20, the quality of the roll R as the inspection target is inspected using the cartridge CR by the quality control device 100, and a measured value of quality is transmitted to the quality control device 100. The quality control device 100 performs the defective/non-defective determination of the roll R as the inspection target on the basis of the difference (residual) between the predictive value and the measured value of quality. The quality control device 100 decides whether to withdraw the rolls R for one lot in which the roll R as the inspection target is included, to the assembly process 30 (withdrawal permission/inhibition) on the basis of the defective/non-defective determination result. In a case where the roll R as the inspection target is determined to be non-defective, the quality control device 100 decides to withdraw the rolls R for one lot in which the roll R as the inspection target is included, to the assembly process 30 (withdrawal available).

In the assembly process 30, each of the pancakes PC included in each of the rolls R for one lot which has been withdrawn is incorporated into the cartridge CR. The cartridge CR is subjected to a shipping inspection to inspect the appearance and the like, and is shipped as a finished product.

The roll R which has been subjected to the quality inspection may be discarded. As a result, the number of rolls as the inspection target in the shipping inspection is reduced, which leads to a reduction in inspection man-hours (time) in the shipping inspection.

Figure 2:
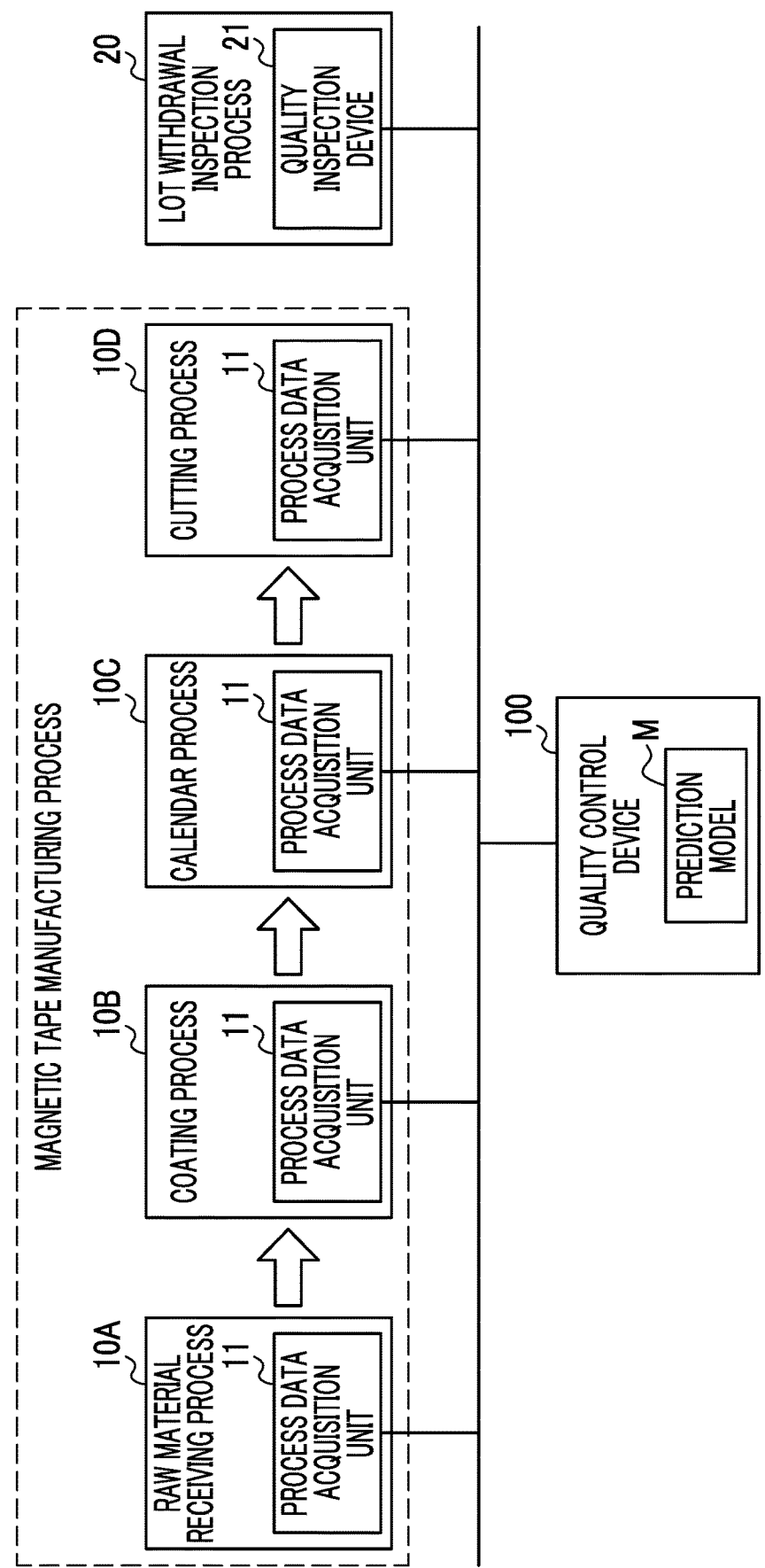
FIG. 2 is a diagram illustrating each process included in a magnetic tape manufacturing process.

As illustrated in FIG. 2, in the magnetic tape manufacturing process 10, for example, a raw material receiving process 10A, a coating process 10B, a calendering process 10C, and a cutting process 10D are included. In each process, the process data acquisition unit 11 described above is provided.

In the raw material receiving process 10A, a base film, a magnetic paint, and the like are received as the raw material of the roll R, and an inspection or the like is performed on the received raw material. The magnetic paint is formed by kneading and dispersing a mixture of magnetic powder in a binder, an additive, a solvent, and the like. As the magnetic powder, iron oxide, chromium oxide, metal particles, barium ferrite, strontium ferrite, epsilon iron oxide, and the like are used. In the raw material receiving process 10A, for example, a measured value of a switching field distribution (SFD) of ferromagnetic powder is acquired as the process data by the process data acquisition unit 11.

Figure 3:
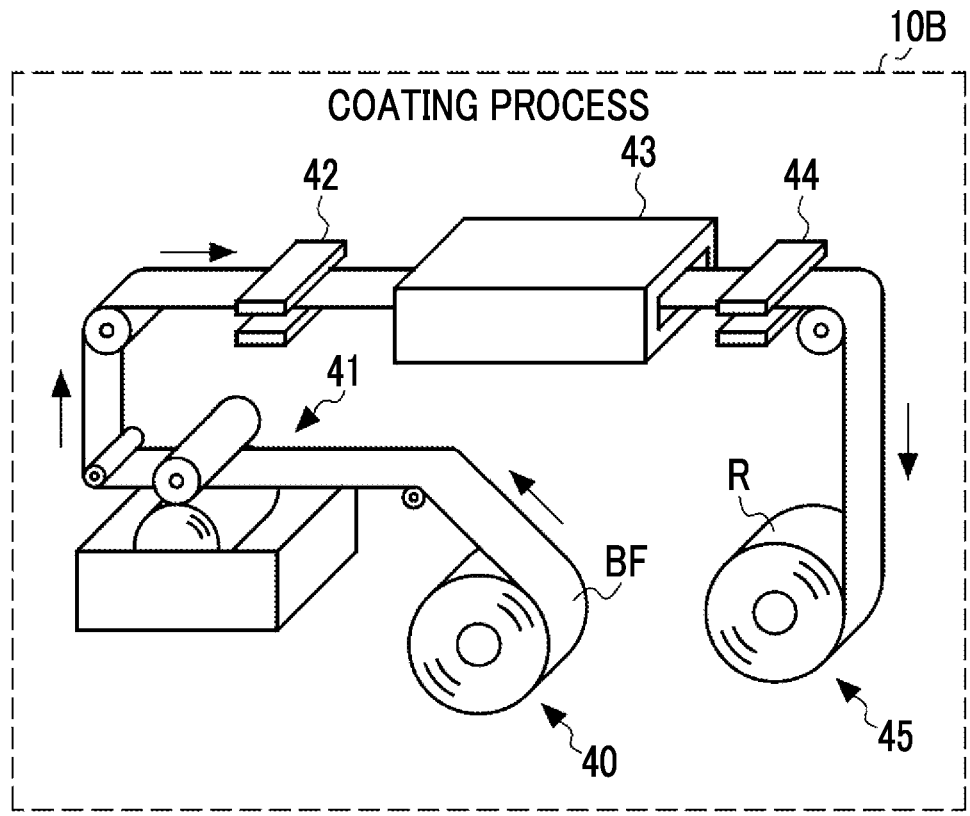
FIG. 3 is a schematic diagram illustrating a coating process.

As illustrated in FIG. 3, in the coating process 10B, an unwinding unit 40, a coating unit 41, an alignment processing unit 42, a drying unit 43, a thickness measurement unit 44, and a winding unit 45 are included. The unwinding unit 40 unwinds a roll-shaped base film BF. The base film BF unwound by the unwinding unit 40 passes through the coating unit 41, the alignment processing unit 42, the drying unit 43, and the thickness measurement unit 44, and is wound by the winding unit 45.

The coating unit 41 applies the magnetic paint on the surface of the base film BF unwound by the unwinding unit 40. The alignment processing unit 42 performs alignment processing of aligning the orientations of the magnetic materials of the magnetic paint applied on the surface of the base film BF. The drying unit 43 dries the magnetic paint applied to the surface of the base film BF. The thickness measurement unit 44 measures the thickness of a magnetic layer formed on the surface of the base film BF by drying the magnetic paint. The winding unit 45 winds the base film BF that has passed through the thickness measurement unit 44. Hereinafter, the base film BF wound by the winding unit 45 after the magnetic layer is formed is referred to as the roll R. The plurality of rolls R included in one lot are manufactured using the same raw material.

In the coating process 10B, the process data acquisition unit 11 is, for example, a temperature sensor, and acquires the temperature of drying air (hereinafter, referred to as a drying air temperature) by the drying unit 43, as the process data. The process data acquisition unit 11 may be the thickness measurement unit 44, and may acquire the thickness of the magnetic layer as the process data. Further, the process data acquisition unit 11 may be an air flow meter, and may acquire the volume of the drying air (hereinafter, referred to as a drying air volume) by the drying unit 43, as the process data.

Figure 4:
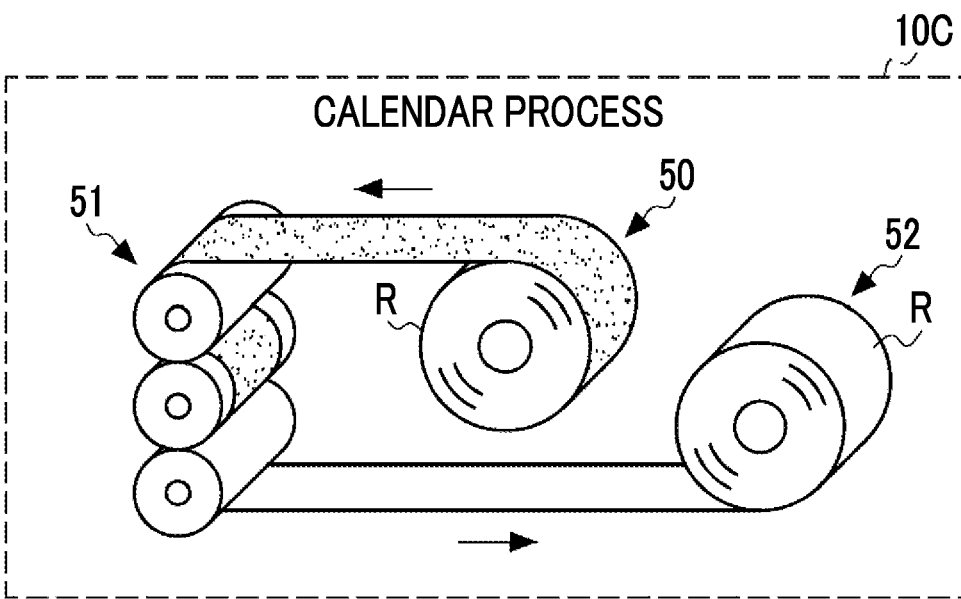
FIG. 4 is a schematic diagram illustrating a calendering process.

As illustrated in FIG. 4, in the calendering process 10C, an unwinding unit 50, a heating and pressurizing processing unit 51, and a winding unit 52 are included. The unwinding unit 50 unwinds the roll R. The roll R unwound by the unwinding unit 50 passes through the heating and pressurizing processing unit 51, and is wound by the winding unit 52.

The heating and pressurizing processing unit 51 is a so-called calendering device that performs machining (mirror finishing) to smooth the surface of the roll R on which the magnetic layer is formed using a plurality of heat rollers that perform heating and pressurizing.

In the calendering process 10C, the process data acquisition unit 11 is, for example, a temperature sensor, and acquires a heating temperature during the heating and pressurizing processing, as the process data. Further, the process data acquisition unit 11 may be a thickness measurement sensor, and may acquire the film thickness of the magnetic layer after the heating and pressurizing processing, as the process data.

Figure 5:
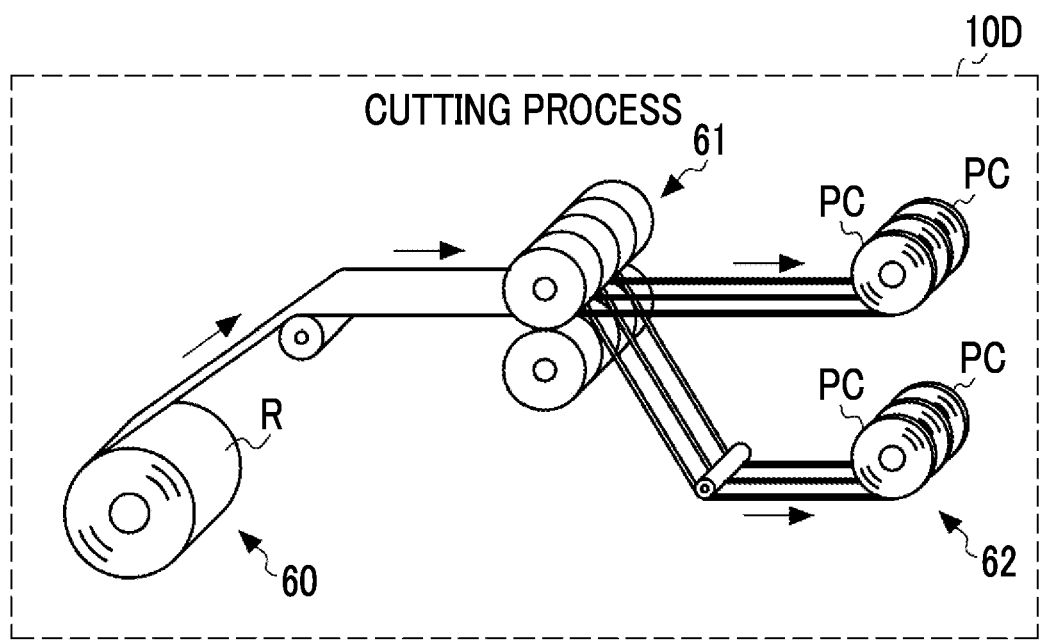
FIG. 5 is a schematic diagram illustrating a cutting process.

As illustrated in FIG. 5, in the cutting process 10D, an unwinding unit 60, a cutting unit 61, and a winding unit 62 are included. The unwinding unit 60 unwinds the roll R. The cutting unit 61 cuts the roll R using a rotating knife. By this cutting, the roll R becomes a plurality of magnetic tapes having a constant tape width. The winding unit 62 winds each magnetic tape cut by the cutting unit 61 to obtain the plurality of pancakes PC.

In the cutting process 10D, the process data acquisition unit 11 is, for example, a measurement sensor, and acquires the width of the magnetic tape (tape width).

Figure 6:
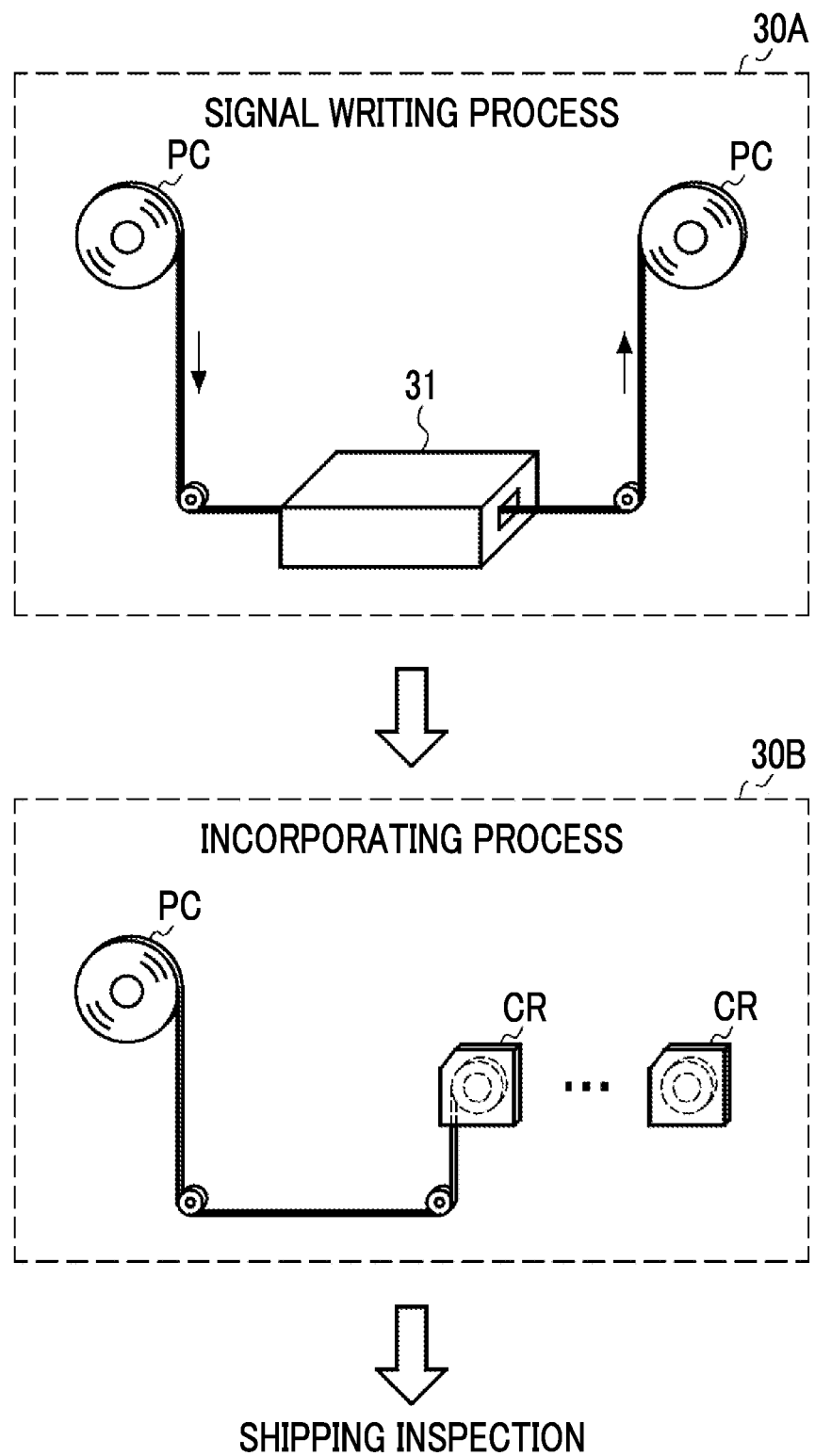
FIG. 6 is a diagram illustrating each process included in an assembly process.

As illustrated in FIG. 6, in the assembly process 30, a signal writing process 30A and an incorporating process 30B are included. In the signal writing process 30A, a servo signal is written to the pancake PC by a servo writer 31. The servo signal is a magnetic signal for confirming that a head that reads the signal of the magnetic tape follows a predetermined position of the magnetic tape. The servo writer 31 performs confirmation (verification) of the written servo signal, in addition to the writing of the servo signal.

In the incorporating process 30B, the magnetic tape in which the servo signal is written in the signal writing process 30A is unwound from the pancake PC, and is wound into the cartridge CR to be incorporated into the cartridge CR. As a result, the cartridge CR is completed. The magnetic tape unwound from one pancake PC is divided and incorporated into a plurality of cartridges CR. For example, 5 to 20 cartridges CR are manufactured from one pancake PC.

In the lot withdrawal inspection process 20, as the quality of the roll R, for example, a signal for inspection is written to the magnetic tape incorporated into the cartridge CR, and a reproduction output (for example, 2T Amplitude [unit: %]) is measured.

Figure 7:
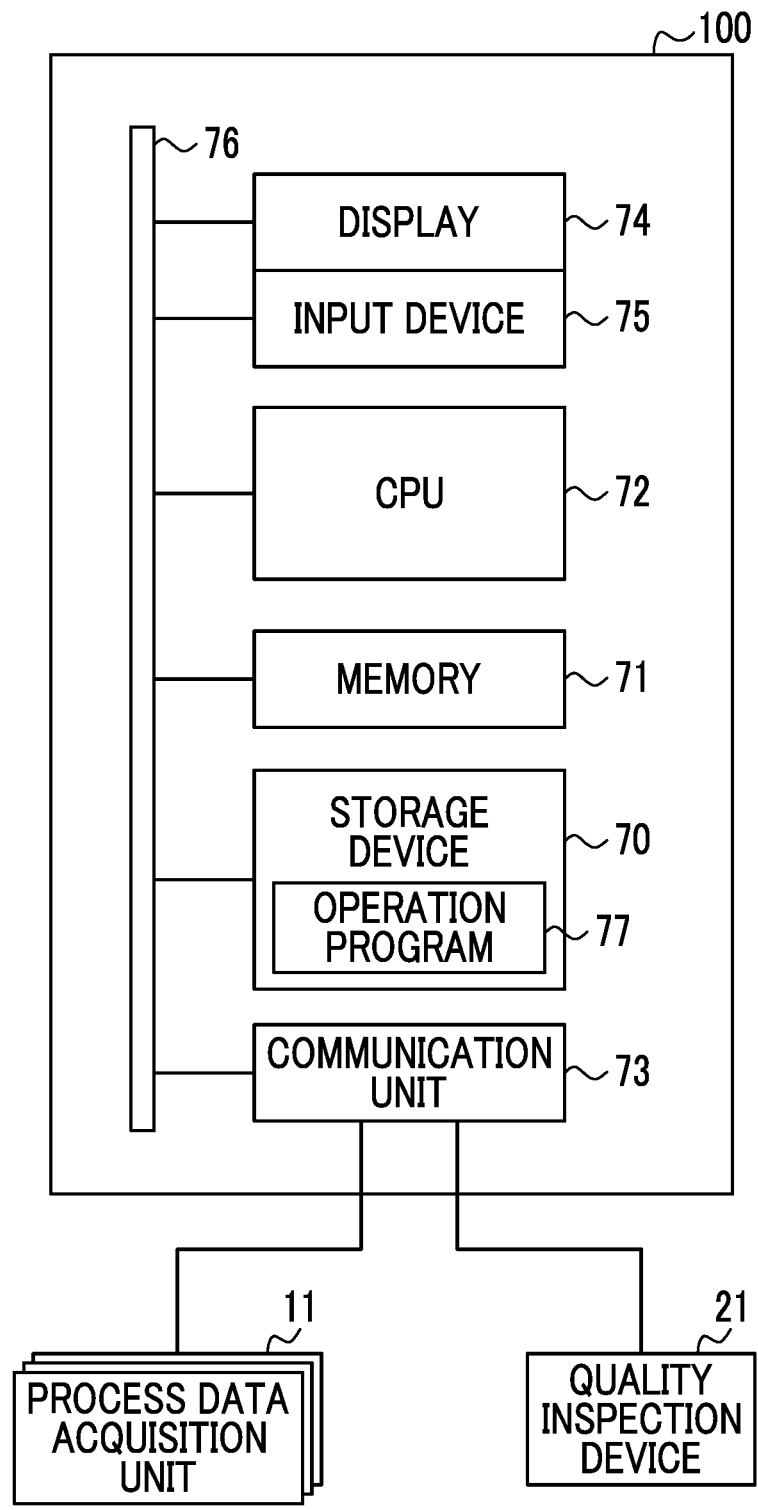
FIG. 7 is a block diagram illustrating a configuration of a computer.

The quality control device 100 is configured by a computer. In FIG. 7, the computer constituting the quality control device 100 comprises, for example, a storage device 70, a memory 71, a central processing unit (CPU) 72, a communication unit 73, a display 74, and an input device 75. These are connected to each other through a bus line 76.

The storage device 70 is a hard disk drive that is built in the computer or is connected through a cable or a network. The storage device 70 may be a disk array in which a plurality of hard disk drives are connected. In the storage device 70, an operation program 77 for causing the CPU 72 to function as various functional units is stored. Instead of or in addition to the hard disk drive, a solid state drive may be used.

The memory 71 is a work memory required for the CPU 72 executing processing. The CPU 72 performs overall control of each unit of the computer by loading the operation program 77 stored in the storage device 70 to the memory 71 and executing the processing according to the operation program 77.

The communication unit 73 is a network interface to perform transmission control of various kinds of information through the network. The process data acquisition unit 11 and the quality inspection device 21 are connected to the quality control device 100 via the communication unit 73. The display 74 is a display device that displays various screens. The computer accepts an input of an operation instruction from the input device 75 through the various screens. The input device 75 is a keyboard, a mouse, a touch panel, or the like.

Figure 8:
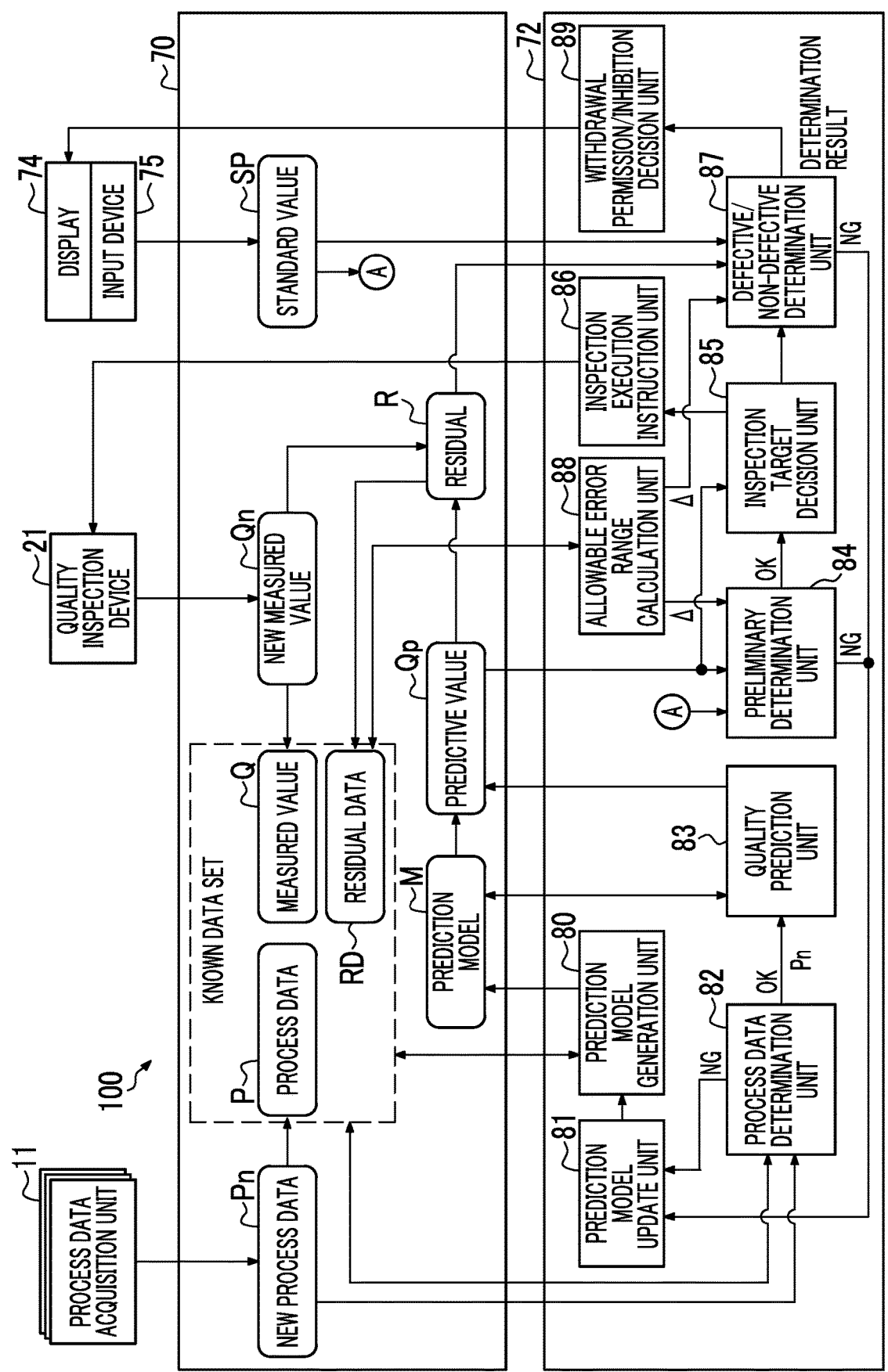
FIG. 8 is a block diagram illustrating functions of a CPU and various kinds of data stored in a storage device.

Next, various functional units realized by the CPU 72 will be described. In FIG. 8, the CPU 72 includes a prediction model generation unit 80, a prediction model update unit 81, a process data determination unit 82, a quality prediction unit 83, a preliminary determination unit 84, an inspection target decision unit 85, an inspection execution instruction unit 86, a defective/non-defective determination unit 87, an allowable error range calculation unit 88, and a withdrawal permission/inhibition decision unit 89.

The prediction model generation unit 80 generates a quality prediction model M by learning the known process data P and the measured value Q of quality for the known process data P, as learning data (teacher data). The prediction model generation unit 80 generates the prediction model M using multiple regression analysis, for example. The multiple regression equation is represented by the following Equation (1).

$$Y = a_1 X_1 + a_2 X_2 + a_3 X_3 + \ldots + a_n X_n + b \quad (1)$$

Here, Y is an objective variable. $X_1$, $X_2$, $X_3$, ..., and $X_n$ are explanatory variables. $a_1$, $a_2$, $a_3$, ..., and an are coefficients. b is a constant.

The prediction model generation unit 80 uses the quality to be inspected by the quality control device 100 as the objective variable, and uses the process data acquired by the process data acquisition unit 11 as the explanatory variable. The prediction model generation unit 80 obtains the optimal coefficient and constant by a gradient descent method or the like, using a plurality of known data sets consisting of the known process data P and the measured value Q. The prediction model M is obtained by applying the optimal coefficient and constant to the multiple regression equation represented by the above Equation (1). The prediction model M can predict the quality with respect to unknown process data.

For example, as illustrated in FIG. 9, the quality (objective variable) is used as the reproduction output. As the process data (explanatory variable) for the quality, the SFD of the ferromagnetic powder, the drying air temperature, the drying air volume, and the tape width are used. The process data set as the explanatory variable is not limited thereto, and the process data theoretically or empirically considered to relate to the quality set as the objective variable may be selected. Here, four pieces of process data are used for simplification of description, but a large number (for example, 150) of pieces of process data are actually used. One piece of process data may be selected as the explanatory variable from one process included in the magnetic tape manufacturing process 10, or a plurality of pieces of process data may be selected as the explanatory variable from one process.

As illustrated in FIG. 10, the prediction model generation unit 80 performs learning (optimization of coefficient and constant) by associating the known process data P and the measured value Q obtained for each roll R with the explanatory variable and the objective variable, and substitutes the optimal coefficient and constant into the multiple regression equation to generate the prediction model M.

The prediction model update unit 81 causes the prediction model generation unit 80 to perform update processing of the prediction model M to generate a new known prediction model M on the basis of a new data set. The prediction model update unit 81 causes the prediction model generation unit 80 to execute the update processing of the prediction model M according to the instruction from the process data determination unit 82, the preliminary determination unit 84, or the defective/non-defective determination unit 87.

The generation and update of the prediction model M by the prediction model generation unit 80 are executed in a learning mode. The learning mode is an operating mode in which the generation and update of the prediction model M are performed using the known data set acquired in advance and/or the known data set acquired in the operational mode described below.

The process data determination unit 82 operates in the operational mode after the generation of the prediction model M. The operational mode is an operating mode in which the roll R as the inspection target for the lot withdrawal inspection is decided by predicting the quality of the rolls R for one lot obtained by the magnetic tape manufacturing process 10, using the prediction model M.

Figure 11:
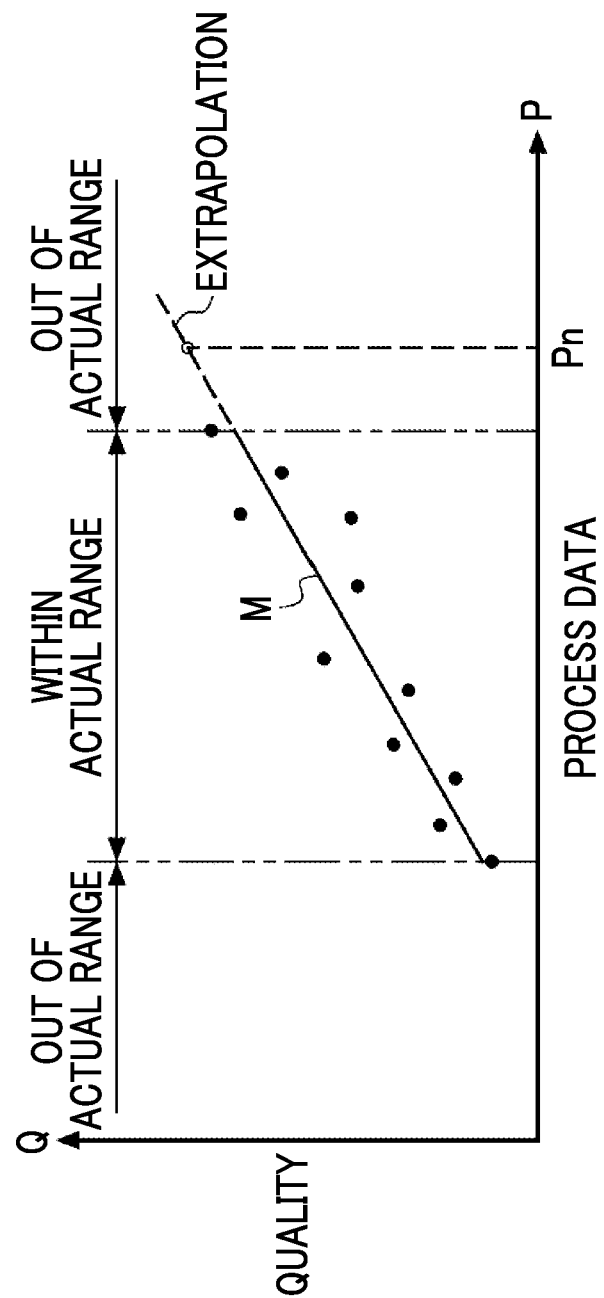
FIG. 11 is a diagram for describing a process data determination.

The process data determination unit 82 determines whether new process data (hereinafter referred to as new process data) Pn acquired by the process data acquisition unit 11 in the operational mode is within a range of the known process data P. That is, the process data determination unit 82 determines whether the new process data Pn is within an actual range of the known process data P each time the new process data Pn is obtained. As illustrated in FIG. 11, the actual range is a range in which the known process data P is distributed, and the prediction model M is generated on the basis of the process data P within the range. For simplification of description, FIG. 11 illustrates a case of simple regression with only one explanatory variable.

For example, as illustrated in FIG. 11, in a case where the new process data Pn is out of the actual range, in order to obtain a predictive value of quality using the prediction model M, it is necessary to extrapolate the prediction model M to the out of the actual range. In a case of extrapolating the prediction model M in this manner, a quality prediction accuracy by the quality prediction unit 83 in the subsequent stage is reduced, the process data determination unit 82 determines whether the new process data Pn is within the actual range in the stage where the new process data Pn is obtained.

Since the actual prediction model M is represented by the multiple regression equation having a plurality of explanatory variables, the process data determination unit 82 determines whether the new process data Pn is within the actual range by a Mahalanobis-Taguchi method (hereinafter, referred to as an MT method). The MT method is a method of detecting the abnormality on the basis of the Mahalanobis distance (hereinafter, referred to as MD) calculated from multidimensional data. The Mahalanobis distance is a distance in which the correlation between the pieces of data is considered, and is different from the Euclidean distance.

Figure 12:
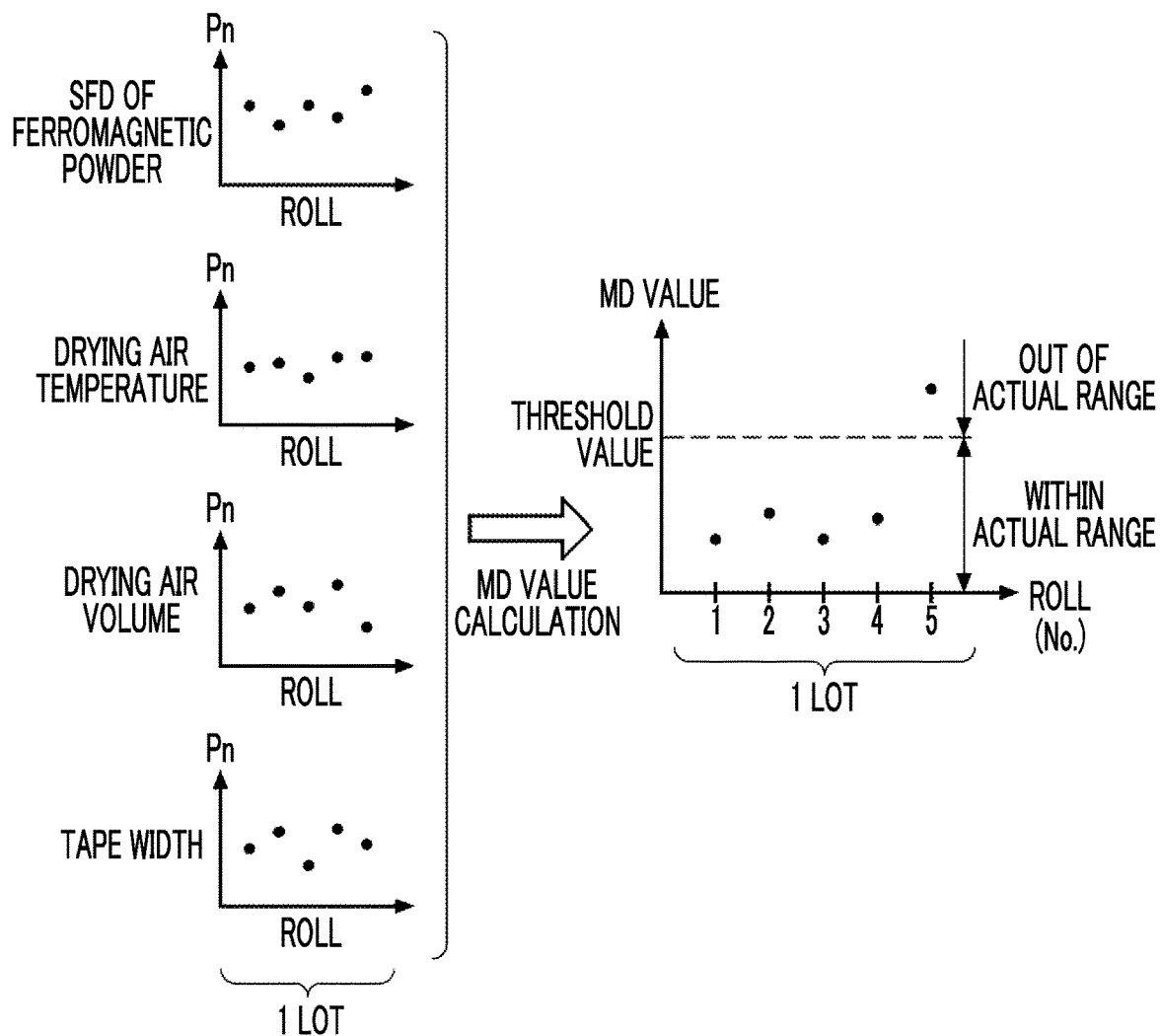
FIG. 12 is a diagram for describing a process data determination using an MD value.

The process data determination unit 82 performs determination on the basis of the MD value representing the distance of the new process data Pn from a data group including the known process data P. Specifically, as illustrated in FIG. 12, the process data determination unit 82 calculates the MD value on the basis of the new process data Pn for each roll R included in one lot. In FIG. 12, for simplification of description, it is assumed that five rolls R are included in one lot.

In the example illustrated in FIG. 12, from the new process data Pn of the SFD of ferromagnetic powder, the drying air temperature, the drying air volume, and the tape width, one MD value is calculated for each roll R. In a case where all of the MD values of the rolls R included in one lot are equal to or less than the threshold value, the process data determination unit 82 determines that the new process data is within the actual range (in the range of known process data P). In a case where at least one MD value in one lot is greater than the threshold value, the process data determination unit 82 determines that the new process data is out of the actual range (out of the range of known process data P).

The Mahalanobis distance is preferably used in a case where there is a correlation between the explanatory variables. In a case where it is considered that there is no correlation between the explanatory variables, the Euclidean distance may be used instead of the Mahalanobis distance. That is, the process data determination unit 82 may perform the above determination by a method in which the Mahalanobis distance is replaced with the Euclidean distance in the MT method.

In a case where all of pieces of the new process data Pn for one lot are within the actual range, the process data determination unit 82 transmits the new process data Pn together with information (OK signal) indicating pass in the process data determination, to the quality prediction unit 83. On the other hand, in a case where at least one piece of the new process data Pn in one lot is out of the actual range, the process data determination unit 82 transmits information (NG signal) indicating failure in the process data determination, to the prediction model update unit 81.

Figure 13:
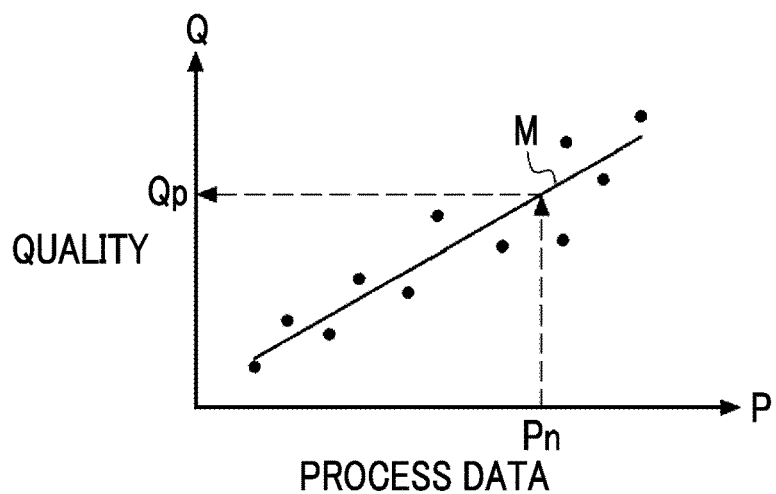
FIG. 13 is a diagram for describing a deriving method of a predictive value based on the prediction model.

The quality prediction unit 83 derives a predictive value Qp of quality of the roll R on the basis of the prediction model M with the new process data Pn as input data. Specifically, as illustrated in FIG. 13, the quality prediction unit 83 derives the predictive value Qp of quality by inputting the new process data Pn to the prediction model M. For simplification of description, as in FIG. 11, FIG. 13 illustrates a case of simple regression with only one explanatory variable. More specifically, the quality prediction unit 83 outputs a value of the objective variable Y as the predictive value Qp by inputting the pieces of the new process data Pn respectively corresponding to the explanatory variables $X_1$, $X_2$, $X_3$, . . . , and $X_n$ of the prediction model M represented by the above Equation (1).

Figure 14:
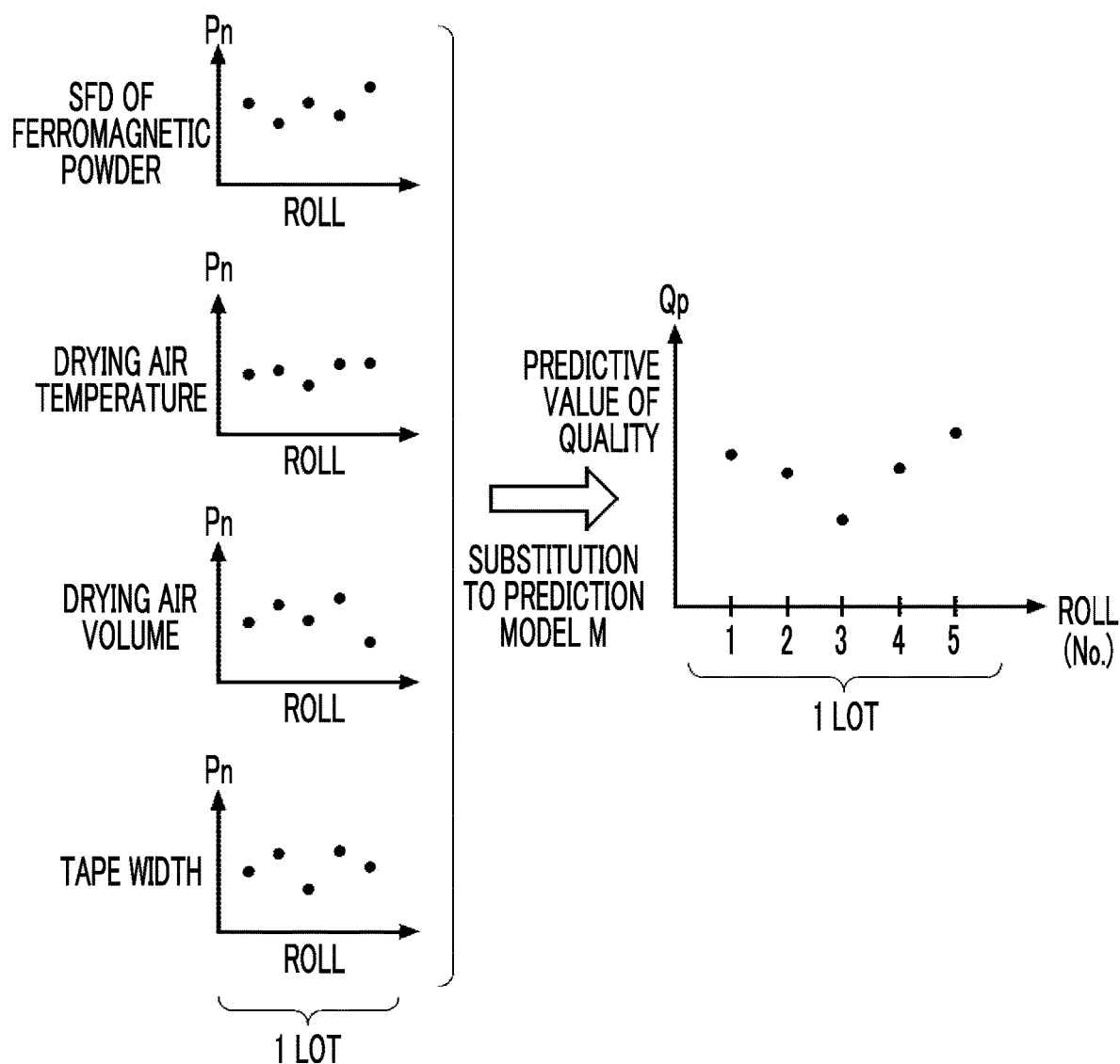
FIG. 14 is a diagram schematically illustrating predictive values for one lot.

As illustrated in FIG. 14, the quality prediction unit 83 derives the predictive value Qp for each roll R included in one lot.

Figure 15:
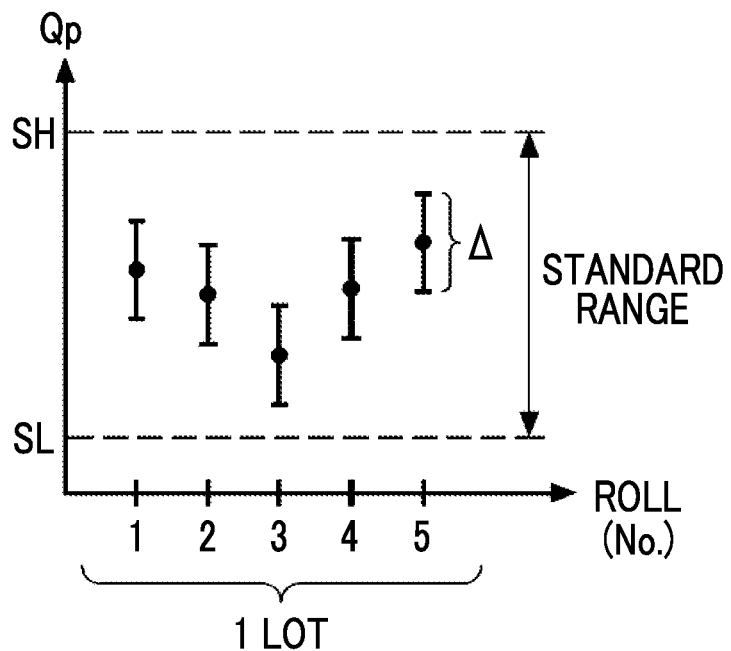
FIG. 15 is a diagram for describing a preliminary determination.

The preliminary determination unit 84 determines whether all of values obtained by adding an error range Δ, which is an allowable error range, to the predictive values Qp for one lot derived by the quality prediction unit 83 are within a standard. Specifically, as illustrated in FIG. 15, the preliminary determination unit 84 determines whether the value obtained by adding the error range Δ based on each predictive value Qp is within a standard range defined by a lower limit value SL and an upper limit value SH. The lower limit value SL and the upper limit value SH are based on a standard SP stored in the storage device 70. The standard SP is set in advance by the operator operating the input device 75, for example. The standard SP may not be defined by the upper limit and the lower limit, and may be defined only by the upper limit or the lower limit.

Figure 16:
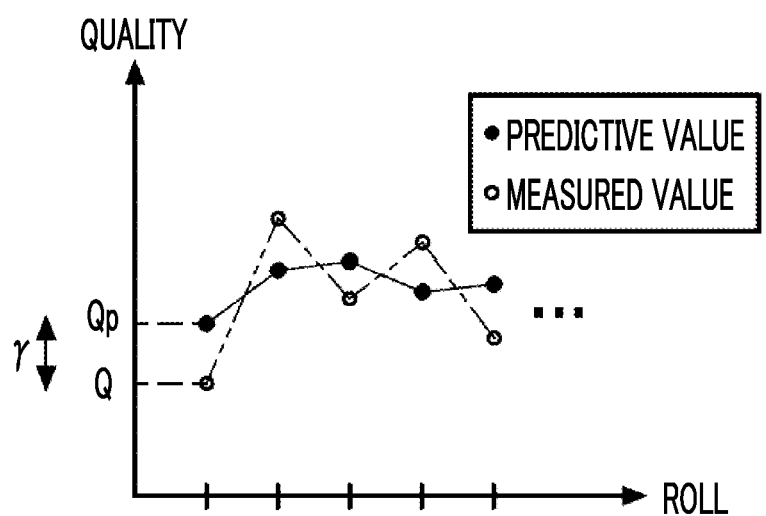
FIG. 16 is a diagram schematically illustrating a residual.

The error range Δ is calculated by the allowable error range calculation unit 88. The allowable error range calculation unit 88 calculates the error range Δ on the basis of residual data RD acquired in the past. As illustrated in FIG. 16, the residual data RD is the known data of a residual γ indicating the difference between the predictive value Qp and the measured value Q, and is stored in the storage device 70.

The residual γ is represented by the following Equation (2).

$$\gamma = Qp - Q \qquad (2)$$

Here, the measured value Q is a measured value of quality of the roll R of which the predictive value Qp is obtained.

Figure 17:
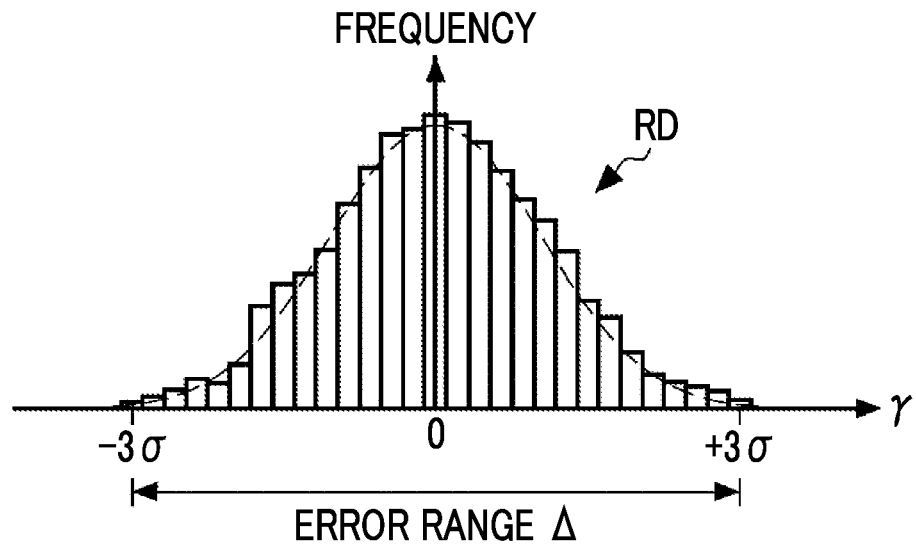
FIG. 17 is a diagram illustrating a relationship between an error range and a frequency distribution of the residual.

As illustrated in FIG. 17, the allowable error range calculation unit 88 calculates the standard deviation σ representing the variation of the known quality on the basis of the frequency distribution of the residual γ configuring the residual data RD. Then, the allowable error range calculation unit 88 determines the error range Δ on the basis of the calculated standard deviation σ. The allowable error range calculation unit 88 sets a range of ±3σ as the error range Δ. The error range Δ is not limited to the range of ±3σ, and can be appropriately changed. The error range Δ can be set to a constant value that does not depend on the residual data RD.

Since the residual γ depends on the prediction accuracy of the prediction model M, it is preferable that the residual data RD for obtaining the error range Δ is based on the predictive value Qp obtained using the same prediction model M.

The allowable error range calculation unit 88 provides information on the error range Δ to the defective/non-defective determination unit 87 described below as well as the preliminary determination unit 84.

In a case where all of the values obtained by adding the error range Δ to the predictive values Qp derived by the quality prediction unit 83 are within the standard, the preliminary determination unit 84 provides information (OK signal) indicating pass in the preliminary determination to the inspection target decision unit 85. On the other hand, in a case where the value obtained by adding the error range Δ to the predictive value Qp of at least one roll R in one lot is out of the standard, the preliminary determination unit 84 transmits information (NG signal) indicating failure in the preliminary determination to the prediction model update unit 81.

Figure 18:
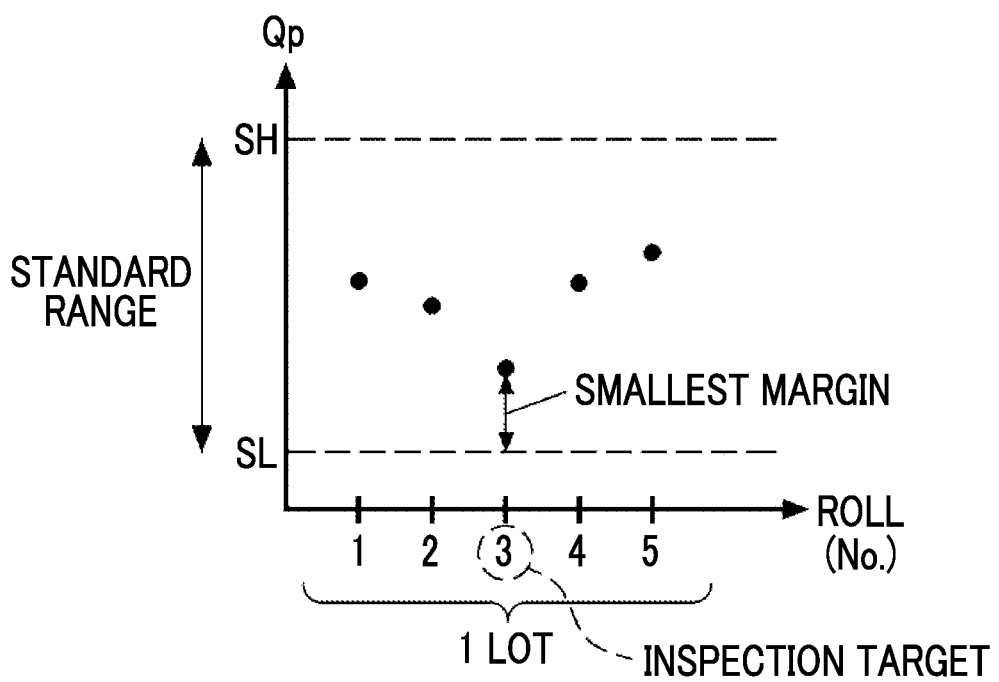
FIG. 18 is a diagram for describing a decision method of an inspection target.

The inspection target decision unit 85 specifies the predictive value Qp having the smallest margin with respect to the standard SP, among the predictive values Qp of quality for one lot derived by the quality prediction unit 83, and decides the roll R of which the specified predictive value Qp is obtained, as the inspection target. Specifically, as illustrated in FIG. 18, the inspection target decision unit 85 decides the roll R of which the predictive value Qp having the smallest difference with the lower limit value SL or the upper limit value SH is obtained, as the inspection target. In the example illustrated in FIG. 18, among rolls No. 1 to No. 5 for one lot, the roll No. 3 is decided as the inspection target.

The inspection target decision unit 85 provides information (identification information of the roll R) on the decided inspection target to the inspection execution instruction unit 86. The inspection execution instruction unit 86 transmits instruction information for executing the quality inspection of the roll R as the inspection target to the quality inspection device 21 on the basis of the information on the inspection target provided from the inspection target decision unit 85.

Figure 19:
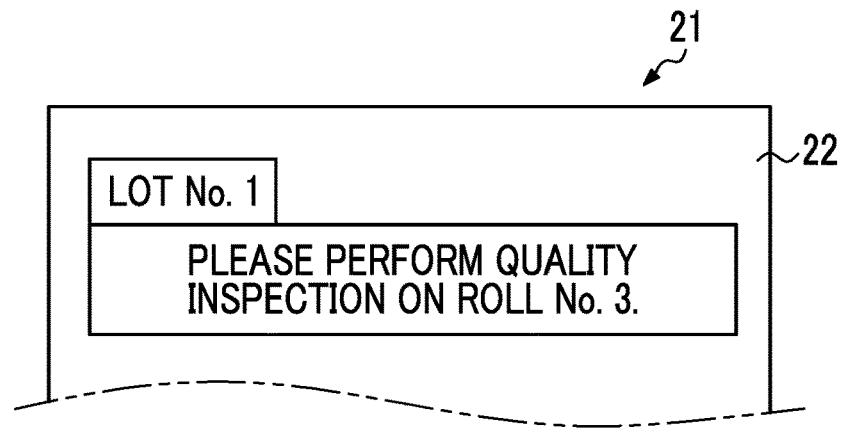
FIG. 19 is a diagram illustrating a specific example of instruction information regarding the inspection target.

In the quality inspection device 21, a display unit such as a display is provided, and the instruction information regarding the inspection target received from the quality inspection device 21 is displayed on the display unit. For example, as illustrated in FIG. 19, the quality inspection device 21 displays, on a display unit 22, a message for prompting execution of the quality inspection on the roll No. 3 decided as the inspection target. The operator can perform the quality inspection on the roll R as the inspection target on the basis of the message displayed on the display unit 22. Hereinafter, the measured value of quality which is measured by the quality inspection device 21 according to the instruction from the inspection execution instruction unit 86 is referred to as a new measured value Qn.

In order to improve the measurement accuracy of the quality, for example, the quality inspection by the quality inspection device 21 is performed using the plurality of cartridges CR manufactured from the roll R as the inspection target. The average value of the measured values of quality of the plurality of cartridges CR is used as the new measured value Qn.

Figure 20:
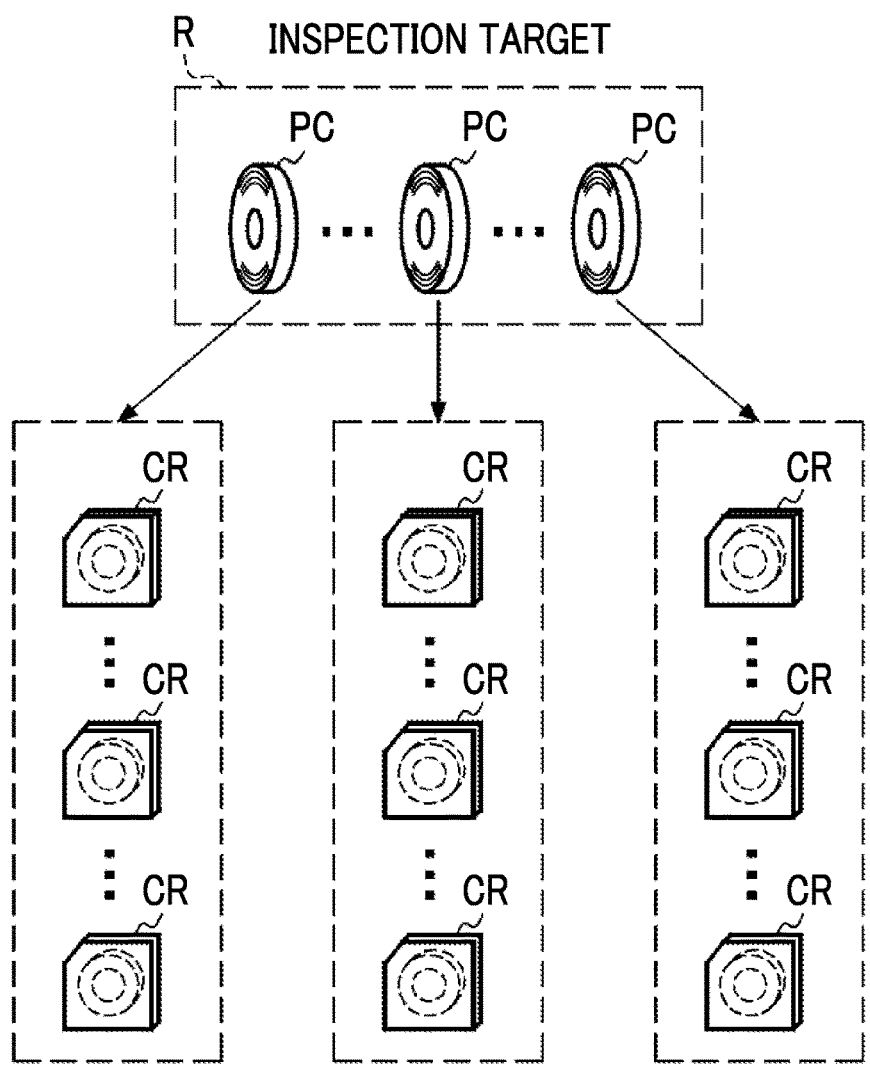
FIG. 20 is a diagram illustrating a selection example of selecting cartridges, for which a quality inspection is performed, from rolls as the inspection target.

For example, as illustrated in FIG. 20, among the plurality of pancakes PC formed from the roll R as the inspection target, three pancakes PC sampled from the center and both ends of the roll R are respectively made to the plurality of cartridges CR in the assembly process 30. Then, the cartridges CR corresponding to the center and both ends of each pancake PC are the quality inspection targets. In this example, for one roll R as the inspection target, a total of nine cartridges CR are inspected. The average value of the measured values of quality using the nine cartridges CR is used as the new measured value Qn. For the roll R as the inspection target, only one cartridge CR may be subjected to the quality inspection.

The quality inspection device 21 transmits the new measured value Qn obtained as a result of the quality inspection to the quality control device 100 automatically or in response to the request from the quality control device 100.

The defective/non-defective determination unit 87 calculates the residual γ between the predictive value Qp and the new measured value Qn on the basis of the following Equation (3).

$$\gamma = Qp - Qn \qquad (3)$$

Here, the new measured value Qn is a measured value (average value of nine measured values in the example illustrated in FIG. 20) of quality of the roll R as the inspection target for which the predictive value Qp is obtained. The new measured value Qn is stored in the storage device 70 as the measured value Q, and the residual γ is stored in the storage device 70 as the residual data RD.

Then, the defective/non-defective determination unit 87 determines whether the calculated residual γ is within the error range Δ. The error range Δ is supplied from the allowable error range calculation unit 88, and is the same value as that used by the preliminary determination unit 84. Since in the preliminary determination by the preliminary determination unit 84, the determination of the value obtained by adding the error range Δ to the predictive value Qp with respect to the standard SP is performed, the new measured value Qn does not become out of the standard as long as the residual γ is within the error range Δ.

Figure 21:
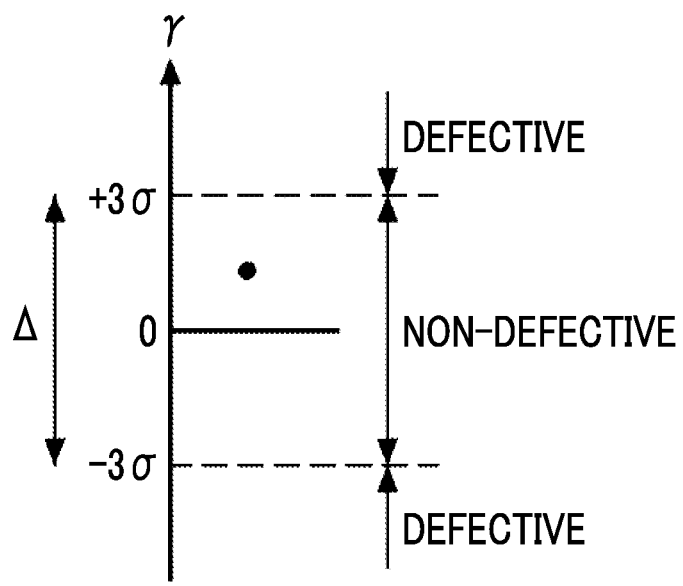
FIG. 21 is a diagram for describing a defective/non-defective determination.

Accordingly, as illustrated in FIG. 21, in a case where the residual γ is within the error range Δ, the defective/non-defective determination unit 87 determines that the roll R as the inspection target is non-defective and the lot to which the roll R as the inspection target belong is non-defective (all of the plurality of rolls R included in the corresponding lot are non-defective).

On the other hand, in a case where the residual γ is out of the error range Δ, the defective/non-defective determination unit 87 determines that the roll R as the inspection target is defective. In this case, the defective/non-defective determination unit 87 transmits information (NG signal) indicating failure in defective/non-defective determination to the prediction model update unit 81.

Figure 22:
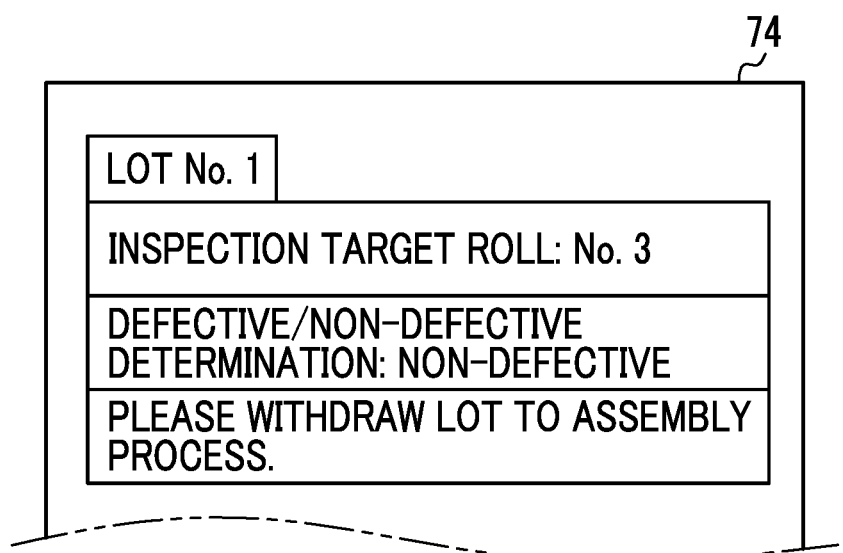
FIG. 22 is a diagram illustrating a specific example of information regarding lot withdrawal permission/inhibition.

The defective/non-defective determination unit 87 transmits the determination result of the defective/non-defective determination to the withdrawal permission/inhibition decision unit 89. The withdrawal permission/inhibition decision unit 89 displays, on the display 74, information regarding the withdrawal permission/inhibition of the lot in which the roll R as the inspection target is included to the assembly process 30, on the basis of the determination result received from the defective/non-defective determination unit 87. For example, as illustrated in FIG. 22, in a case where it is determined that the roll No. 3 as the inspection target is non-defective, the withdrawal permission/inhibition decision unit 89 displays, on the display 74, a message for prompting the withdrawal of the lot including the roll No. 3 to the assembly process 30. The operator can perform the work of withdrawal of the lot to the assembly process 30 on the basis of the message displayed on the display 74.

In a case where the roll R as the inspection target is defective, the defective/non-defective determination unit 87 displays, on the display 74, information indicating that the withdrawal of the lot in which the roll R as the inspection target is included to the assembly process 30 is inhibited. Further, the defective/non-defective determination unit 87 may display, on the display 74, information indicating that the lot in which the corresponding roll R is included has to be inspected again. The re-inspection is the sampling inspection to perform quality inspection on the plurality of rolls R other than the roll R that is decided as the inspection target by the inspection target decision unit 85.

Similarly, in a case of the failure in process data determination by the process data determination unit 82, and in a case of the failure in preliminary determination by the preliminary determination unit 84, information indicating that the withdrawal of the lot to the assembly process 30 is inhibited may be displayed on the display 74. In this case, a message for prompting the execution of the sampling inspection to perform quality inspection on the plurality of rolls R may be further displayed on the display 74.

In a case of the failure in process data determination, the failure in preliminary determination, or the failure in defective/non-defective determination, the prediction model update unit 81 may cause the prediction model generation unit 80 to execute the update processing of the prediction model M. In a case of updating the prediction model M, the prediction model generation unit 80 performs learning again by adding the new measured value Qn and the new process data Pn newly acquired after the generation of the prediction model M, to the known data set.

Figure 23:
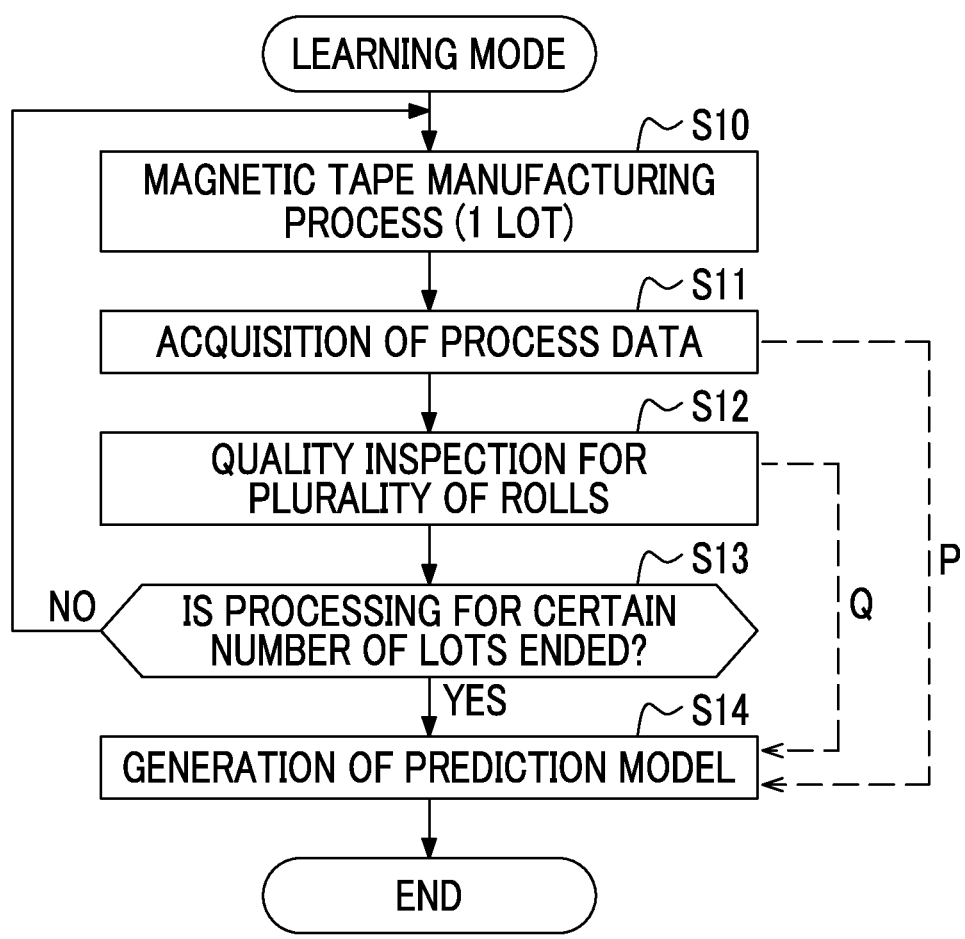
FIG. 23 is a flowchart illustrating processing executed in a learning mode.
Figure 24:
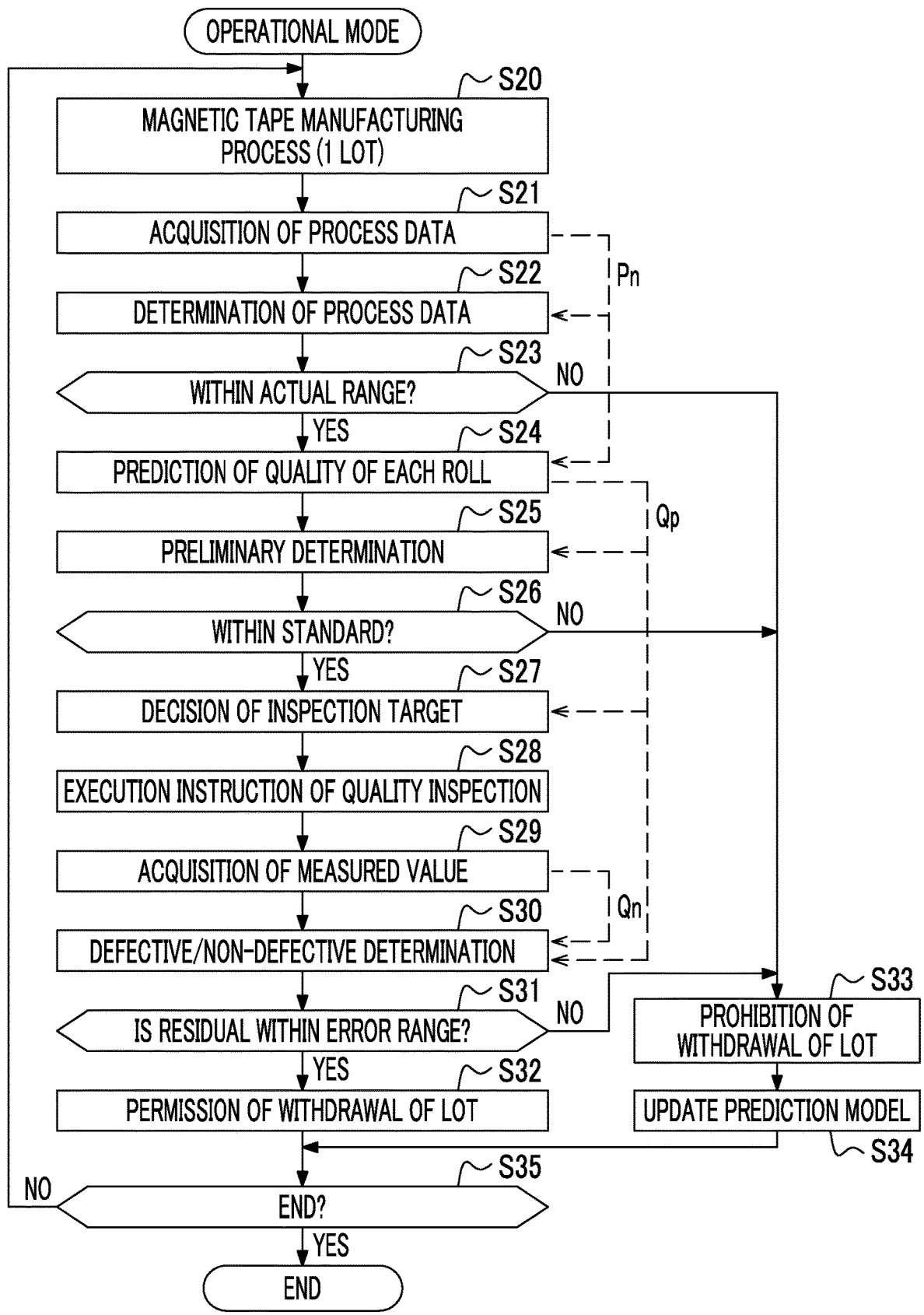
FIG. 24 is a flowchart illustrating processing executed in an operational mode.

Next, the operation of the above configuration will be described using the flowcharts illustrated in FIGS. 23 and 24. First, a learning mode for performing the generation of the prediction model M will be described with reference to FIG. 23. In the magnetic tape manufacturing process 10, the rolls R for one lot are processed to manufacture the plurality of pancakes PC (Step S10). Next, the process data P acquired by the process data acquisition unit 11 in each process during the manufacturing is transmitted to the quality control device 100 (Step S11). Step S10 and Step S11 may be performed in parallel.

In a case where the manufacturing of the rolls R for one lot is ended by the magnetic tape manufacturing process 10, the quality inspection using the quality inspection device 21 is performed on the plurality of rolls R among the rolls R for one lot (Step S12). Here, among the rolls R in one lot, the plurality of rolls R at preset positions become the inspection targets. All of the rolls R in one lot may be the inspection targets. The measured value Q of quality measured by the quality inspection device 21 is supplied to the quality control device 100.

The processing of Steps S10 to S12 is repeatedly executed. Whether the processing of Steps S10 to S12 is performed for a certain number of lots is determined (Step S13), and in a case where the processing for a certain number of lots is ended (Step S13: YES), the processing proceeds to Step S14. In Step S14, the prediction model generation unit 80 generates the prediction model M by performing learning using the known data set consisting of the process data P and the measured value Q as the teacher data (refer to FIG. 10).

Next, the operational mode for determining the withdrawal permission/inhibition of a newly manufactured lot on the basis of the prediction model M will be described with reference to FIG. 24. First, in the magnetic tape manufacturing process 10, the rolls R for one lot are processed to manufacture the plurality of pancakes PC (Step S20). Next, the new process data Pn acquired by the process data acquisition unit 11 in each process during the manufacturing is transmitted to the quality control device 100 (Step S21). Step S20 and Step S21 may be performed in parallel.

Next, whether the new process data Pn for one lot acquired in Step S21 is within a range (actual range) of the known process data P is determined by the process data determination unit 82 (Step S22). This determination is performed using the MT method, for example (refer to FIG. 12). In a case where all of pieces of the new process data Pn for one lot are within the actual range (Step S23: YES), the processing proceeds to Step S24. On the other hand, in a case where at least one piece of the new process data Pn in one lot is out of the actual range (Step S23: NO), the processing proceeds to Step S33.

In Step S24, the predictive value Qp of quality for each roll R is derived by the quality prediction unit 83 on the basis of the new process data Pn for one lot acquired in Step S21. The derivation of the predictive value Qp is performed using the prediction model M generated in the above-described learning mode (refer to FIGS. 13 and 14).

Next, whether all of the values obtained by adding the error range Δ to the predictive values Qp for one lot derived in Step S24 are within the standard SP is determined by the preliminary determination unit 84 (Step S25). The preliminary determination is performed using the error range Δ calculated by the allowable error range calculation unit 88 (refer to FIG. 15). The error range Δ is calculated on the basis of the residual data RD acquired in the past such as the learning mode (refer to FIGS. 16 and 17). In a case where all of the values obtained by adding the error range Δ to the predictive values Qp for one lot are within the standard SP (Step S26: YES), the processing proceeds to Step S27. On the other hand, in a case where the value obtained by adding the error range Δ to the predictive value Qp of at least one roll R in one lot is out of the standard SP (Step S26: NO), the processing proceeds to Step S33.

In Step S27, among the predictive values Qp for one lot derived in Step S24, the predictive value Qp having the smallest margin with respect to the standard SP is specified by the inspection target decision unit 85. Then, the roll R for which the specified predictive value Qp is obtained is decided as the inspection target (refer to FIG. 18). In a case where the roll R as the inspection target is decided, the instruction information for executing the quality inspection of the roll R as the inspection target is transmitted to the quality inspection device 21 by the inspection execution instruction unit 86 (Step S28). In response to this, the message for prompting the operator to perform the quality inspection on the roll R decided as the inspection target is displayed on the display unit 22 of the quality inspection device 21 (refer to FIG. 19).

The quality inspection is performed using the plurality of cartridges CR created from the pancake PC from which the roll R as the inspection target is extracted (refer to FIG. 20). The average value of measured values of quality of the plurality of cartridges CR is used as the new measured value Qn. In a case where the new measured value Qn is acquired by the quality inspection device 21, the new measured value Qn is transmitted to the quality control device 100 (Step S29).

The defective/non-defective determination unit 87 performs the defective/non-defective determination on the basis of the residual γ which is the difference between the predictive value Qp of quality of the roll R as the inspection target and the new measured value Qn acquired in Step S29 (Step S30). Specifically, whether the residual γ is within the error range Δ is determined by the defective/non-defective determination unit 87 (refer to FIG. 21). In a case where the residual γ is within the error range Δ (Step S31: YES), the processing proceeds to Step S32. On the other hand, in a case where the residual γ is out of the error range Δ (Step S31: NO), the processing proceeds to Step S33.

In Step S32, the withdrawal of the lot including the roll R as the inspection target to the assembly process 30 is decided by the withdrawal permission/inhibition decision unit 89 (Step S32). In this case, a message for prompting the withdrawal of the corresponding lot to the assembly process 30 is displayed on the display 74 (refer to FIG. 22).

In Step S33, the withdrawal of the lot including the roll R as the inspection target to the assembly process 30 is decided to be inhibited by the withdrawal permission/inhibition decision unit 89. Then, the update processing of the prediction model M is executed by the prediction model generation unit 80 (Step S34). The lot of which the withdrawal is decided to be inhibited is appropriately subjected to the inspection again by the operator, and in a case where the lot has passed the re-inspection, the lot is withdrawn to the assembly process 30 in lot units or roll units.

After Steps S32 and S34, whether the end operation is performed using the input device 75 or the like by the operator is determined (Step S35). In a case where the end operation is performed by the operator (Step S35: YES), the processing is ended. In a case where the end operation is not performed by the operator (Step S35: NO), the processing proceeds to Step S20 again.

As described above, according to the technology of the present disclosure, among the predictive values Qp of quality of a plurality of products (rolls R) obtained by the quality prediction unit 83, a product for which the predictive value Qp having the smallest margin with respect to the preset standard SP is obtained is decided as the inspection target. As a result, since the quality for the plurality of products can be determined on the basis of the inspection result of only one product, it is possible to guarantee the quality for a plurality of products and reduce inspection costs.

In the technology of the present disclosure, in a case where the residual γ indicating the difference between the predictive value Qp of the product decided as the inspection target and the new measured value Qn of quality of the product obtained by inspecting the inspection target is within the error range Δ, all of the plurality of products are determined to be non-defective by the defective/non-defective determination unit 87. Further, in the technology of the present disclosure, before the quality inspection, whether all of the values obtained by adding the error range Δ to the predictive values Qp derived by the quality prediction unit 83 are within the standard SP is determined by the preliminary determination unit 84. As a result, even though it is determined that the residual γ is within the error range Δ by the defective/non-defective determination unit 87, it is possible to preliminarily guarantee that the new measured value Qn is unlikely to be out of the standard SP.

In the technology of the present disclosure, at the time point of acquiring a plurality of pieces of process data, whether the plurality of pieces of process data are within a range of the known process data is determined by the process data determination unit 82. In a case where it is determined that the plurality of pieces of process data are not within the range of the known process data, the prediction model M is updated using the measured values of quality of the plurality of products, and therefore, it is possible to suppress the execution of the quality inspection with a low reliability due to the low prediction accuracy of the quality.

In the above embodiment, the roll R corresponds to the product. The products in the present disclosure are not limited to finished products, but include semi-finished products or goods in process.

Further, in the above embodiment, the quality item to be inspected in the quality inspection is set to be only one (in the above embodiment, reproduction output), the number of quality items is not limited one, and a plurality of quality items may be used. In a case of the magnetic tape, in addition to the reproduction output, a resolution or an S/N ratio of signals is exemplified as the quality. In a case where the number of quality items is two or more, the quality items are used as the objective variable, process data as the explanatory variable may be selected for each objective variable. That is, the prediction model M may be generated for each quality item.

In the above embodiment, the prediction model M is configured by the multiple regression model, but can be configured by a generalized additive model without being limited to the multiple regression model. Further, the prediction model M can be configured by a neural network. The prediction model M can be generated by ensemble learning represented by random forests and gradient tree boosting, a support vector machine, regularized regression, logistic regression, or the T method.

In the above embodiment, the update of the prediction model M is executed in a case of failure in any of the process data determination, the preliminary determination, and the defective/non-defective determination, but the update of the prediction model M is not essential. Whether to update the prediction model M may be decided by the operation using the input device 75 or the like by the operator according to the determination result.

In the embodiment, the quality control device 100 is applied to the production process of the magnetic tape cartridge, but can be applied to the production process of various products without being limited to the magnetic tape cartridge. In particular, the quality control device 100 is applied to a production process in which the sampling inspection is performed and the inspected product is discarded without being shipped.

In the embodiment, for example, as a hardware structure of a processing unit which executes various kinds of processing, such as the prediction model generation unit 80, the prediction model update unit 81, the process data determination unit 82, the quality prediction unit 83, the preliminary determination unit 84, the inspection target decision unit 85, the inspection execution instruction unit 86, the defective/non-defective determination unit 87, the allowable error range calculation unit 88, and the withdrawal permission/inhibition decision unit 89, various processors described below can be used. The various processors include, for example, a programmable logic device (PLD) that is a processor of which the circuit configuration can be changed after manufacture, such as a field-programmable gate array (FPGA), and a dedicated electric circuit that is a processor having a dedicated circuit configuration designed to execute specific processing, such as an application specific integrated circuit (ASIC), in addition to the CPU that is a general-purpose processor which executes software (operation program) to function as various processing units as described above.

One processing unit may be configured by one of the various processors or a combination of the same or different kinds of two or more processors (for example, a combination of a plurality of FPGAs and/or a combination of a CPU and an FPGA). In addition, a plurality of processing units may be configured by one processor.

As an example where a plurality of processing units are configured by one processor, first, there is a form where one processor is configured by a combination of one or more CPUs and software as typified by a computer, such as a client and a server, and this processor functions as a plurality of processing units. Second, there is a form where a processor realizing the functions of the entire system including a plurality of processing units by one integrated circuit (IC) chip as typified by system on chip (SoC) or the like is used. In this manner, various processing units are configured by using one or more of the above-described various processors as hardware structures.

In addition, specifically, an electric circuit (circuitry) obtained by combining circuit elements, such as semiconductor elements, can be used as the hardware structure of the various processors.

From the above description, the invention described in Additional remarks 1 to 5 described below can be grasped.

Additional Remark 1

A quality control device that controls quality of a product manufactured through a plurality of processes, comprising:
at least one processor,
wherein the processor
generates a prediction model to predict quality of a product with respect to unknown process data by performing learning using known process data obtained from the plurality of processes and a measured value of quality of the product with respect to the known process data as learning data,
derives a predictive value of quality of each of a plurality of products, which are manufactured after the prediction model is generated, on the basis of the prediction model using process data of the plurality of products as input data, and
among the plurality of predictive values of quality, decides the product for which the predictive value having the smallest margin with respect to a preset standard is obtained as an inspection target.

Additional Remark 2

The quality control device according to Additional remark 1,
wherein the processor determines that all of the plurality of products are non-defective in a case where a residual representing a difference between the predictive value of the product decided as the inspection target by the inspection target decision unit and the measured value of quality of the product obtained by inspecting the inspection target is within an error range which is an allowable error range.

Additional Remark 3

The quality control device according to Additional remark 2,
wherein the process includes a function of determining whether all of values obtained by adding the error range to the derived predictive values are within the standard, and
the processor performs decision of the inspection target in a case where the preliminary determination unit determines that all of the values obtained by adding the error range to the predictive values are within the standard.

Additional Remark 4

The quality control device according to Additional remark 2,
wherein the processor updates the prediction model using the measured values of quality of the plurality of products in a case where it is determined that the residual is not within the error range.

Additional Remark 5

The quality control device according to Additional remark 4, further comprising:
wherein the processor includes a function of determining whether the process data of the plurality of products manufactured after the prediction model is generated is within a range of the known process data, and
the processor updates the prediction model using the measured values of quality of the plurality of products in a case where it is determined that the process data of the plurality of products is not within the range of the known process data.

In the technology of the present disclosure, it is also possible to appropriately combine the above-described various embodiments and various modification examples. Further, without being limited to the embodiments described above, various configurations can be adopted without departing from the scope. Further, in addition to the program, the technology of the present disclosure also extends to a storage medium that stores the program non-temporarily.

The contents described and illustrated above are detailed descriptions of a part relating to the technology of the present disclosure, and are merely examples of the technology of the present disclosure. For example, the above description regarding the configuration, function, action, and effect is a description regarding an example of the configuration, function, action, and effect of a part of the present disclosure. Accordingly, it goes without saying that with respect to the contents described and illustrated above, unnecessary parts may be deleted, new elements may be added or replaced within a range not departing from the scope of the technology of the present disclosure. In addition, in order to avoid complications and facilitate understanding of a part relating to the technology of the present disclosure, in the contents described and illustrated above, descriptions regarding common technical knowledge and the like that do not require any explanation to enable the implementation of the technology of the present disclosure are omitted.

In this specification, "A and/or B" is synonymous with "at least one of A or B". That is, "A and/or B" may be only A, may be only B, or a combination of A and B.

All documents, patent applications, and technical standards disclosed in this specification are incorporated in this specification by reference to the same extent as if the documents, the patent applications, and the technical standards were specifically and individually stated to be incorporated by reference.

What is claimed is:

1. A quality control device that controls quality of a product manufactured through a plurality of processes, comprising a processor, the processor being configured to:
   acquire process data, which includes at least one parameter associated with manufacturing of the product, from the plurality of processes by at least one of a sensor, a timer, a data input terminal or a data reading terminal;
   measure quality of the product using a quality inspection device;
   generate a prediction model to predict quality of the product with respect to unknown process data by performing learning using known process data obtained from the plurality of processes and a measured value of quality of the product measured by the quality inspection device with respect to the known process data as learning data;
   derive a predictive value of quality of each of a plurality of products, which are manufactured after the prediction model is generated, on the basis of the prediction model using process data of the plurality of products as input data;
   calculate a difference between the predictive value of quality of each of the plurality of products and a preset standard and choose as an inspection target the product with the smallest difference among the plurality of products; and
   determine that all of the plurality of products are non-defective based on the predictive value of the product that is decided as the inspection target; and
   a display that displays a result from the determining.

2. The quality control device according to claim 1, wherein
   the processor determines that all of the plurality of products are non-defective where a residual representing a difference between the predictive value of the product decided as the inspection target and the measured value of quality of the product obtained by inspecting the inspection target is within an error range which is an allowable error range.

3. The quality control device according to claim 2, wherein the error range is a range determined on the basis of a standard deviation representing a variation of measured value of quality with respect to the predictive value.

4. The quality control device according to claim 2, wherein the processor is further configured to:
   determine whether all of values obtained by adding the error range to the predictive values are within the preset standard; and
   choose the inspection target where the processor determines that all of the values obtained by adding the error range to the predictive values are within the preset standard.

5. The quality control device according to claim 2, wherein the processor is further configured to:
   update the prediction model using the measured values of quality of the plurality of products where the processor determines that the residual is not within the error range.

6. The quality control device according to claim 5, wherein the processor is further configured to:
   determine whether the process data of the plurality of products manufactured after the prediction model is generated is within a range of the known process data; and
   update the prediction model using the measured values of quality of the plurality of products where the processor determines that the process data of the plurality of products is not within the range of the known process data.

7. The quality control device according to claim 6, wherein the processor determines whether the process data of the plurality of products is within the range of the known process data by a Mahalanobis-Taguchi method or a method in which a Mahalanobis distance is replaced with a Euclidean distance in the Mahalanobis-Taguchi method.

8. The quality control device according to claim 1, wherein the prediction model is generated using at least one of a multiple regression model, a generalized additive model, a neural network, an ensemble learning, a support vector machine, a regularized regression, a logistic regression, or a Taguchi-method.

9. A quality control method of controlling quality of a product manufactured through a plurality of processes, comprising:
   by a processor, acquiring process data, which includes at least one parameter associated with manufacturing of the product, from the plurality of processes by at least one of a sensor, a timer, a data input terminal or a data reading terminal;
   measuring quality of the product;
   generating a prediction model to predict quality of the product with respect to unknown process data by performing learning using known process data obtained from the plurality of processes and a measured value of quality of the product with respect to the known process data as learning data;
   deriving a predictive value of quality of each of a plurality of products, which are manufactured after the prediction model is generated, on the basis of the prediction model using process data of the plurality of products as input data; and
   calculating a difference between the predictive value of quality of each of the plurality of products and a preset standard and choosing as an inspection target the product with the smallest difference among the plurality of products;

determining that all of the plurality of products are non-defective based on the predictive value of the product that is decided as the inspection target; and displaying a result from the determining.

10. A non-transitory computer-readable storage medium storing a program of controlling quality of a product manufactured through a plurality of processes, the program causing a computer to execute:

acquiring process data, which includes at least one parameter associated with manufacturing of the product, from the plurality of processes by at least one of a sensor, a timer, a data input terminal or a data reading terminal;

measuring quality of the product;

generating a prediction model to predict quality of the product with respect to unknown process data by performing learning using known process data obtained from the plurality of processes and a measured value of quality of the product with respect to the known process data as learning data;

deriving a predictive value of quality of each of a plurality of products, which are manufactured after the prediction model is generated, on the basis of the prediction model using process data of the plurality of products as input data; and calculating a difference between the predictive value of quality of each of the plurality of products and a preset standard and choosing as an inspection target the product with the smallest difference among the plurality of products;

determining that all of the plurality of products are non-defective based on the predictive value of the product that is decided as the inspection target; and displaying a result from the determining.

\* \* \* \* \*